(12) United States Patent
Aker et al.

(10) Patent No.: US 11,079,362 B2
(45) Date of Patent: Aug. 3, 2021

(54) RETENTION OF DEFORMABLE MEMORY MATERIAL IN FLOW PATH

(71) Applicant: FLIR Detection, Inc., Stillwater, OK (US)

(72) Inventors: Craig Aker, Stillwater, OK (US); Steven Keen, Perkins, OK (US); Lara Wald, Stillwater, OK (US); Mark Fisher, Stillwater, OK (US)

(73) Assignee: FLIR Detection, Inc., Stillwater, OK (US)

( * ) Notice: Subject to any disclaimer, the term of this patent is extended or adjusted under 35 U.S.C. 154(b) by 0 days.

(21) Appl. No.: 16/209,107

(22) Filed: Dec. 4, 2018

(65) Prior Publication Data
US 2019/0113490 A1    Apr. 18, 2019

Related U.S. Application Data

(63) Continuation-in-part of application No. 15/256,443, filed on Sep. 2, 2016, now Pat. No. 10,209,231.

(60) Provisional application No. 62/598,920, filed on Dec. 14, 2017.

(51) Int. Cl.
*G01N 31/22* (2006.01)
*F03G 7/06* (2006.01)
*F16K 31/02* (2006.01)
*F16K 31/00* (2006.01)

(52) U.S. Cl.
CPC ............. *G01N 31/22* (2013.01); *F03G 7/065* (2013.01); *F16K 31/002* (2013.01); *F16K 31/025* (2013.01)

(58) Field of Classification Search
None
See application file for complete search history.

(56) References Cited

U.S. PATENT DOCUMENTS

| | | | |
|---|---|---|---|
| 4,788,039 A | 11/1988 | Glattstein | |
| 6,447,478 B1 * | 9/2002 | Maynard | F03G 7/065 600/151 |
| 6,558,626 B1 | 5/2003 | Aker et al. | |
| 7,208,122 B2 | 4/2007 | Swager et al. | |

(Continued)

FOREIGN PATENT DOCUMENTS

| | | | | |
|---|---|---|---|---|
| CN | 103502817 | | 1/2014 | |
| DE | 1837071 | * | 9/2007 | B01J 8/00 |

OTHER PUBLICATIONS

Chambers et al., "Perspectives on Pentaerythritol Tetranitrate (PETN) Decomposition", Lawrence Livermore National Laboratory, Jul. 1, 2002, 20 pages.

(Continued)

*Primary Examiner* — Xiaoyun R Xu
(74) *Attorney, Agent, or Firm* — Haynes and Boone, LLP

(57) ABSTRACT

Various techniques are provided to secure a memory polymer component in a flow path. In one embodiment, a method includes providing a memory component in a rest state, performing a deformation operation to transition the component from the rest state to a deformed state, inserting the component into a flow path defined by interior side walls of a structure, and applying a stimulus to transition the component from the deformed state to an intermediate state in which the component abuts the side walls to secure the component in the flow path. Additional devices, systems, and related methods are also provided.

16 Claims, 15 Drawing Sheets

(56) References Cited

U.S. PATENT DOCUMENTS

| | | |
|---|---|---|
| 7,393,503 B2 | 7/2008 | Swager et al. |
| 7,419,636 B2 | 9/2008 | Aker et al. |
| 7,662,309 B2 | 2/2010 | Swager et al. |
| 7,799,573 B2 | 9/2010 | Deans et al. |
| 7,943,062 B2 | 5/2011 | Swager et al. |
| 8,313,576 B2 | 12/2012 | Aker et al. |
| 8,377,713 B2 | 2/2013 | Miller et al. |
| 8,465,678 B2 | 6/2013 | Swager et al. |
| 8,647,579 B2 | 2/2014 | La Grone et al. |
| 9,005,524 B2 | 4/2015 | Deans et al. |
| 9,068,960 B2 | 6/2015 | Wald et al. |
| 2003/0216804 A1* | 11/2003 | DeBeer ............... A61F 2/915 623/1.15 |
| 2011/0083431 A1* | 4/2011 | Mankame ............ F03G 7/065 60/527 |
| 2012/0003746 A1 | 1/2012 | Amisar |
| 2014/0017803 A1 | 1/2014 | Deans et al. |
| 2014/0106463 A1* | 4/2014 | Wald ................... G01N 31/227 436/110 |
| 2015/0084772 A1 | 3/2015 | Namioka |
| 2015/0285780 A1 | 10/2015 | Kelley et al. |
| 2015/0330957 A1 | 11/2015 | Wald et al. |

OTHER PUBLICATIONS

Hadlington, Simon, "Shape-Shifting Polymers", Chemistry World, Mar. 10, 2010, 2 pages.

Shen et al., "A Multiple-Shape Memory,Polymer-Metal Composite Actuator Capable of Programmable Control, Creating Complex 3D Motion of Bending, Twisting, and Oscillation", Scientific Reports, Apr. 15, 2016, pp. 1-11, Article No. 24462.

Xie et al., "Strain-Based Temperature Memory Effect for Nafion and Its Molecular Origins", Advanced Functional Materials, Jun. 7, 2011, pp. 2057-2066, vol. 21, Issue 11.

\* cited by examiner

RETENTION OF DEFORMABLE MEMORY MATERIAL IN FLOW PATH

CROSS-REFERENCE TO RELATED APPLICATIONS

This application claims the benefit of and priority to U.S. Provisional Patent Application No. 62/598,920 filed Dec. 14, 2017 and entitled "RETENTION OF DEFORMABLE MEMORY MATERIAL IN FLOW PATH," which is incorporated herein by reference in its entirety.

This patent application is also a continuation-in-part of U.S. patent application Ser. No. 15/256,443 filed Sep. 2, 2016 and entitled "ENHANCED CHEMICAL DETECTION USING ACID CATALYZED HYDROLYSISM," which is hereby incorporated by reference in its entirety.

TECHNICAL FIELD

The present invention relates generally to chemical detection and flow path implementations and, more particularly, to the detection of trace materials of interest and the retention of components in flow paths.

BACKGROUND

Detection of explosives for security is an area of ongoing global concern. Concerted efforts have been focused on the detection of trace amounts of explosives, including nitrogen-based explosives.

Conventional detection methods, such as X-ray diffraction, nuclear quadruple resonance, ion mobility spectrometry, mass spectrometry, and gas chromatography are known and are highly sensitive and effective. Systems used to carry out these methods, however, are expensive, difficult to maintain, susceptible to false positives, and are not easily manufactured into low-power, portable devices.

Colorimetric techniques are known that can detect the presence of nitrogen-based explosives. Portable colorimetric chemical kits have the value of displaying interpreted optical signals with fast response times. These methods, however, have a number of disadvantages, including low sensitivity, high false alarm rates, and inconvenient analysis and clean-up procedures due to the liquid-based detection mechanisms. In addition, these methods can often expose users to large quantities of chemicals through repeated wet-chemistry style sampling steps.

In some cases, detectors or other components may be positioned in a flow path to receive analytes passing therethrough. As such, it may be desirable to position various components in the flow path in a manner that is secure and resilient to real world conditions. However, conventional positioning techniques may not always be practical. For example, if a component is not sufficiently secured within the flow path, then it may unintentionally migrate down the flow path or become dislodged from an intended position. This can interfere with the overall operation of a device, particularly in cases where a component is used for chemical reactions that are intended to occur at a particular physical location, such as at a portion of the flow path upstream from various chemical reporters.

Moreover, if a component is secured within a flow path by adhesives or other bonding materials, this may introduce chemicals into the flow path that affect detection readings. In addition, the relatively small size of certain flow paths may make conventional mechanical engagements impractical.

SUMMARY

In various embodiments, a memory material component may be secured in a flow path in a convenient and reliable manner that utilizes certain unique expansion properties of the component. For example, the component may be a deformable component that is configured to transition from a deformed state back to a rest state or an intermediate state in response to heat. By utilizing these features in various unique implementations, the component may be effectively inserted and secured within a flow path of a detector or any type of flow path having any desired geometry.

In one embodiment, a method includes providing a memory material component in a rest state; performing a deformation operation to transition the component from the rest state to a deformed state; inserting the component into a flow path defined by interior side walls of a structure; and applying a stimulus to transition the component from the deformed state to an intermediate state in which the component abuts the side walls to secure the component in the flow path.

In another embodiment, a device includes a structure comprising interior side walls defining a flow path; a memory material component disposed within the flow path; and wherein the component is secured within the flow path by abutment against the side walls in response to: a deformation operation to transition the component from a rest state to a deformed state for insertion into the flow path, and an application of a stimulus to transition the component from the deformed state to an intermediate state in which the component abuts the side walls.

In various embodiments, a non-volatile acid catalyst (e.g., also referred to as a reactant or acidic reagent) is provided that facilitates the detection of certain nitrogen-based explosives at a chemical reporter upon hydrolysis of the nitrogen-based explosives. Hydrolysis of the nitrogen-based explosives yields nitric acid, which causes the chemical reporter to provide a detectable response. Nitrogen-based explosives may cause other chemical reporters to provide detectable responses, and additional materials of interest, such as peroxide-based explosives, may also cause chemical reporters to provide detectable responses.

Accordingly, various techniques are provided for the detection of trace amounts of nitrogen-based explosives without the disadvantages of the prior art. Such techniques are particularly useful in the detection of nitrate esters, such as nitroglycerin, and nitramines, such as Research Department Explosive (RDX). In some embodiments, the presence of a nitrogen-based explosive is based on the detection of a response of a reporter to the hydrolysis product of the nitrogen-based explosive.

In one embodiment, a method includes receiving a vapor-phase nitric acid precursor; hydrolyzing the vapor-phase nitric acid precursor in the presence of an acid catalyst to form nitric acid; receiving the nitric acid at a chemical reporter of a chemical detector; and detecting, by the chemical detector, a response of the chemical reporter to the nitric acid to determine whether materials of interest are present.

In another embodiment, a device includes an inlet configured to receive a vapor-phase nitric acid precursor; an acid catalyst configured to react with the vapor-phase nitric acid precursor to form nitric acid; and a chemical detector comprising a chemical reporter configured to respond to the nitric acid, wherein the chemical reporter is configured to detect a response of the chemical reporter to the nitric acid to determine whether materials of interest are present.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
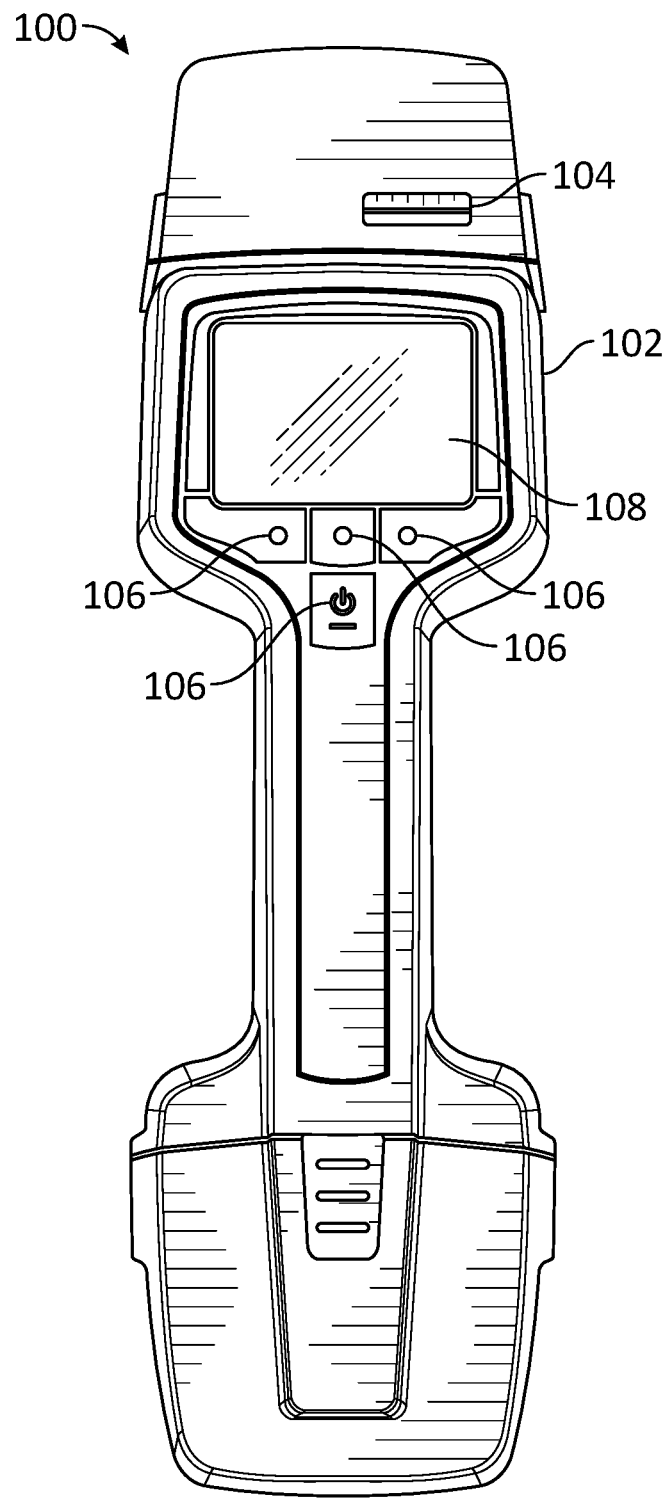
FIG. 1 illustrates an external view of a trace material detection device in accordance with an embodiment of the disclosure.

In accordance with various embodiments disclosed herein, a non-volatile acid catalyst (e.g., also referred to as a reactant or acidic reagent) is provided that enhances the detection of one or more materials of interest. In some embodiments, the acid catalyst reacts with a nitrogen-based explosive to increase the rate of hydrolysis of the nitrogen-based explosive, thereby increasing the rate of production of nitric acid. A chemical reporter then receives the nitric acid and responds to the nitric acid to produce a detectable result. In various embodiments, a different chemical reporter responds to the nitrogen-based explosive to produce a detectable result. Advantageously, in some embodiments, the nitrogen-based explosive is detectable at two different chemical reporters based on two different detection techniques. In yet other embodiments, the acid catalyst reacts with other materials of interest (e.g., peroxide-based explosives) to provide results that signal the presence of other materials of interest.

Devices and related methods are provided in accordance with a variety of techniques to detect the presence of trace chemicals corresponding to materials of interest using acid catalyzed hydrolysis. In this regard, certain materials of interest may exhibit a fluorescent response, a change in fluorescence, a luminescent response, a change in luminescence, an infrared/Raman response, or a change in resistivity when exposed to an acid catalyst.

Various nitrogen-based explosives, including nitrate esters and nitramines, undergo acid catalyzed hydrolysis to produce nitric acid. For example, when an acid catalyst reacts with nitroglycerin, one of the products of the reaction is nitric acid. The source of water in the reaction can be from water in the air or from water on the surface of the acid catalyst.

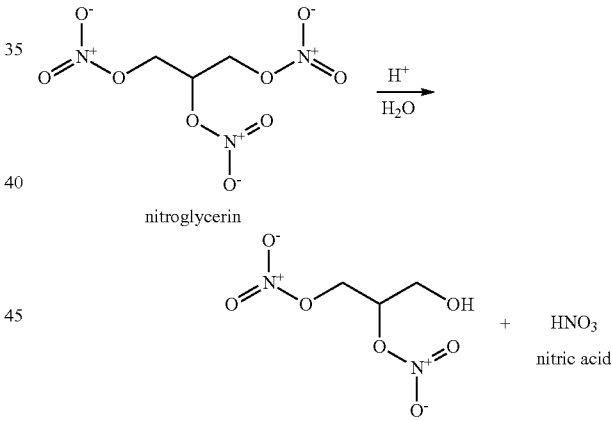

The produced nitric acid is received by a chemical reporter in a chemical detector. The chemical reporter responds to the nitric acid to provide a detectable response. In some embodiments, this response may be the result of a change in the chemical reporter that may be detected at a particular type of detector of the chemical reporter, which signals the presence of a material of interest (e.g., a nitrogen-based explosive). For example, in some embodiments, the change may be a change in fluorescence of the chemical reporter that is detected by an optical detector. In some embodiments, the change may be a change in resistivity of the chemical reporter that is detected by an appropriate electrical detector. In some embodiments, the change may be an infrared/Raman response that is detected by an appropriate infrared/Raman response detector. In this way, materials of interest are identified in a convenient, low cost, rapid, and highly portable manner.

Advantageously, the chemical reporter is operable to detect any nitrogen-based explosive that produces nitric acid after hydrolysis. Thus, rather than being specific to a single explosive, the chemical reporter is able to detect a wide variety of nitrogen-based explosives, including, but not limited to, pentaerythritol tetranitrate (PETN), ethylene glycol dinitrate (EGDN), nitroglycerin, nitroglycerin containing powders such as double-based and triple-based smokeless powders, and cyclotrimethylenetrinitramine (RDX). Additional materials of interest (e.g., peroxide-based explosives) are also detectable as further discussed herein.

In accordance with various embodiments further discussed herein, a change in the chemical reporter may be combined with additional chemical detection techniques to confirm the presence of a nitrogen-based explosive. For example, in some embodiments, an additional chemical reporter that responds to the nitrogen-based explosive (rather than to nitric acid) may be present in the chemical detector. If a change in the additional chemical reporter is detected at a detector, this signals the presence of the nitrogen-based explosive.

In some embodiments, such detection techniques may be combined with additional chemical detection techniques to provide methods and systems for detecting additional classes of materials. For example, certain peroxide-based explosives, such as triacetone triperoxide (TATP) may be detected using, for example, luminescent methods.

Turning now to the drawings, FIG. 1 illustrates an external view of a trace material detection device 100 in accordance with an embodiment of the disclosure. For example, in some embodiments, device 100 may be implemented as a handheld portable detector capable of detecting explosives and/or other materials.

As shown, device 100 includes a housing 102, a slot 104, user controls 106, and a display 108. In various embodiments, additional components of device 100 (e.g., further illustrated in FIG. 2) may be distributed at physical locations internal to and/or external to housing 102.

In operation, sampling media may be brought into physical contact with one or more surfaces to be tested. For example, in some embodiments, a user may wipe the media (e.g., also referred to as a "sampling swab") against a surface of interest to collect trace amounts of one or more test substances resident on the surface. The user then inserts the media into slot 104 after which additional operations and analysis are performed as further discussed herein. In some embodiments, the media may be implemented using an appropriate substrate such as polytetrafluoroethylene (PTFE), an aramid polymer, polyethylene, polyester, paper, and/or other materials.

In some embodiments, use of the media may not be necessary, as an inlet may be used to directly sample ambient air for vapor-phase analytes. Additional devices may be used to direct the analytes into the inlet, such as an air filter/concentrator positioned in the flow path of the analytes.

User controls 106 receive user input to operate device 100. As shown in FIG. 1, user controls 106 may be implemented as physical buttons. In other embodiments, user controls 106 may be implemented by one or more keyboards, levers, joysticks, touchscreens, and/or other controls. In some embodiments, user controls 150 may be integrated with display 108 as a touchscreen.

Display 108 presents information to the user of device 100. For example, FIG. 1 illustrates a warning message provided on display 108 in response to a detected material. In various embodiments, display may be implemented as a liquid crystal display (LCD), an organic light emitting diode (OLED) display, and/or any other appropriate display.

Figure 2:
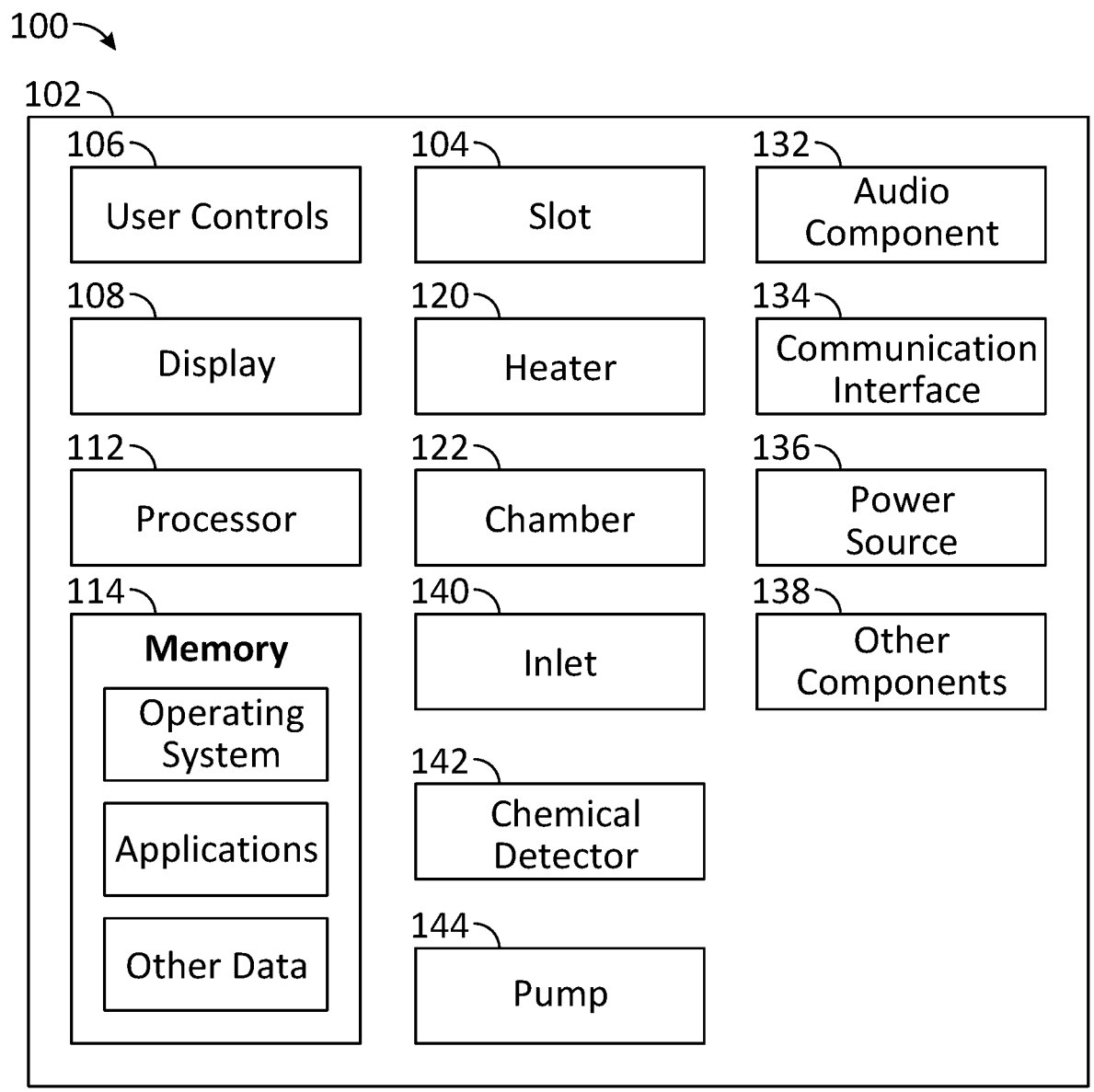
FIG. 2 illustrates a block diagram of a trace material detection device in accordance with an embodiment of the disclosure.

Additional features of device 100 are further illustrated in FIG. 2. FIG. 2 illustrates a block diagram of device 100 in accordance with an embodiment of the disclosure. In addition to several previously discussed components shown in FIG. 1, FIG. 2 further illustrates a processor 112, a memory 114, a heater 120, a chamber 122, an audio component 132, a communication interface 134, a power source 136, an inlet 140, a chemical detector 142, a pump 144, and other components 138.

Processor 112 may be implemented as one or more microprocessors, microcontrollers, system on a chip (SoC), application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of device 100. In this regard, processor 112 may execute machine readable instructions (e.g., software, firmware, or other instructions) stored in memory 114.

Memory 114 may be implemented as a machine readable medium storing various machine readable instructions and data. For example, in some embodiments, memory 114 may store an operating system 115 and one or more applications 116 as machine readable instructions that may be read and executed by processor 112 to perform various operations described herein. Memory 114 may also store various types of data 117 including, for example, chemical profiles, test sample identification results, and/or other information used or provided by the various components of device 100. In various embodiments, memory 114 may be implemented to store such instructions and data in a non-transitory manner and/or may be implemented with both transitory and non-transitory portions to selectively store all or portions of such instructions and data in either manner as appropriate.

Heater 120 may be implemented as one or more heaters (e.g., heaters 120A, 120B, and 120C further discussed herein) used to heat test samples (e.g., provided on a sampling swab) to a desired temperature such that the test samples at least partially vaporize to provide analytes for chemical detection. In some embodiments, heater 120 may be a resistive heater configured to heat the test samples, however other configurations may be used in other embodiments.

Chamber 122 provides a recessed volume within housing 102 and receives the media inserted through slot 104. While disposed in chamber 122, the media may be heated by heater 120.

Audio component 132 may be implemented, for example, as a speaker or other transducer with corresponding driver circuitry to provide audible sounds to a user of device 100. For example, in some embodiments, audio component 132 may provide audible signals in response to manipulation of user controls 106 and/or in response to the operations of processor 112 (e.g., to indicate that a particular material is present or is not present).

Communication interface 134 may be implemented as a wired and/or wireless interface connect device 100 (e.g., by Universal Serial Bus (USB), Ethernet, WiFi, Bluetooth, cellular, infrared, radio, and/or other protocols) with various external devices to update operating system 115, update applications 116, and/or communicate data 117. In some embodiments, communication interface 134 may connect to external power sources (e.g., a power outlet) to charge a battery of power source 136 and/or to directly power device 100.

Power source 136 may be implemented, for example, as a battery to permit mobile and remote use of device 100, a solar power source, a fuel cell, or wall power. In some embodiments, power source 136 may be a removable battery. Other components 138 may also be provided as appropriate for various types of devices 100 to support, for example, application specific operations of such devices.

Inlet 140, chemical detector 142, and pump 144 (e.g., implemented as an emission-based detector and/or using other technologies) may be used with heater 120 to provide a swab-based thermal desorber to perform vapor-based material detection as further discussed herein. In some embodiments, inlet 140 can directly sample ambient air for vapor-phase analytes without the need for the swab-based thermal desorber. For example, air from the ambient environment may be directly drawn into inlet 140.

Figure 3:
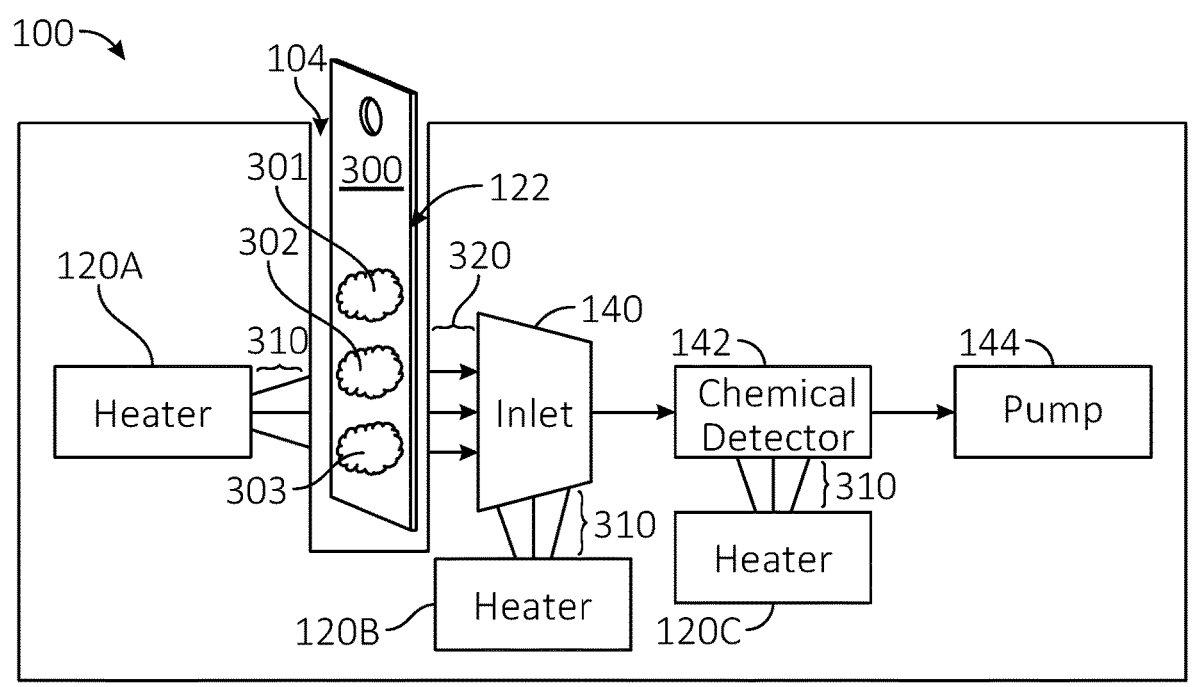
FIG. 3 illustrates an operational flow of analytes through a trace material detection device in accordance with an embodiment of the disclosure.

FIG. 3 illustrates an operational flow of analytes through device 100 in accordance with an embodiment of the disclosure. As shown, media 300 has been inserted through slot 104 in housing 102 and is positioned in chamber 122. Media 300 includes test samples 301, 302, and 303 which correspond to three different materials under test that have been picked up by the user's application of media 300 against one or more surfaces of interest.

As shown, heater 120 is implemented in multiple portions 120A, 120B, and 120C. Heater 120 operates (e.g., in response to control signals provided by processor 112) to apply heat 310 to media 300 and samples 301, 302, and 303 to raise their temperatures to a desired desorption temperature. In some embodiments, the detection temperature may be in the range of approximately 90 degrees C. to approximately 160 degrees C., however higher or lower temperatures may be used as desired.

In some embodiments, heaters 120A and 120B may be implemented to contact media 300. For example, heaters 120A and 120B may be mechanically moved to place the heaters 120A and 120B in contact with or in close proximity to media 300.

In FIG. 3, test sample 301 is 2,4,6-trinitrotoluene (TNT), test sample 302 is nitroglycerin, and test sample 303 is TATP, all of which may be detected by appropriate portions of chemical detector 144.

In this regard, test samples 301, 302, and 303 may be materials that partially or completely vaporize in response to heat 310 applied by heater 120 to provide analytes 320 (e.g., corresponding to vaporized portions of test samples 301, 302, and 303). The vaporized materials may exhibit various vapor pressures that facilitate the ability of pump 144 and chemical detector 142 to appropriately receive the analytes 320 (e.g., RDX has a vapor pressure of $5 \times 10^{-7}$ Torr at 20 degrees C., TNT has a vapor pressure of $2 \times 10^{-5}$ Torr at 20 degrees C., glycerol has a vapor pressure of $2.5 \times 10^{-3}$ Torr at 50 degrees C., and ethanol has a vapor pressure of 45 Torr at 20 degrees C.). Pump 144 operates to draw analytes 320 in and through inlet 140 into chemical detector 142. Based on interactions between analytes 320 and chemical detector 142 (e.g., performing trace detection), the presence of certain materials of interest may be determined.

Figure 4:
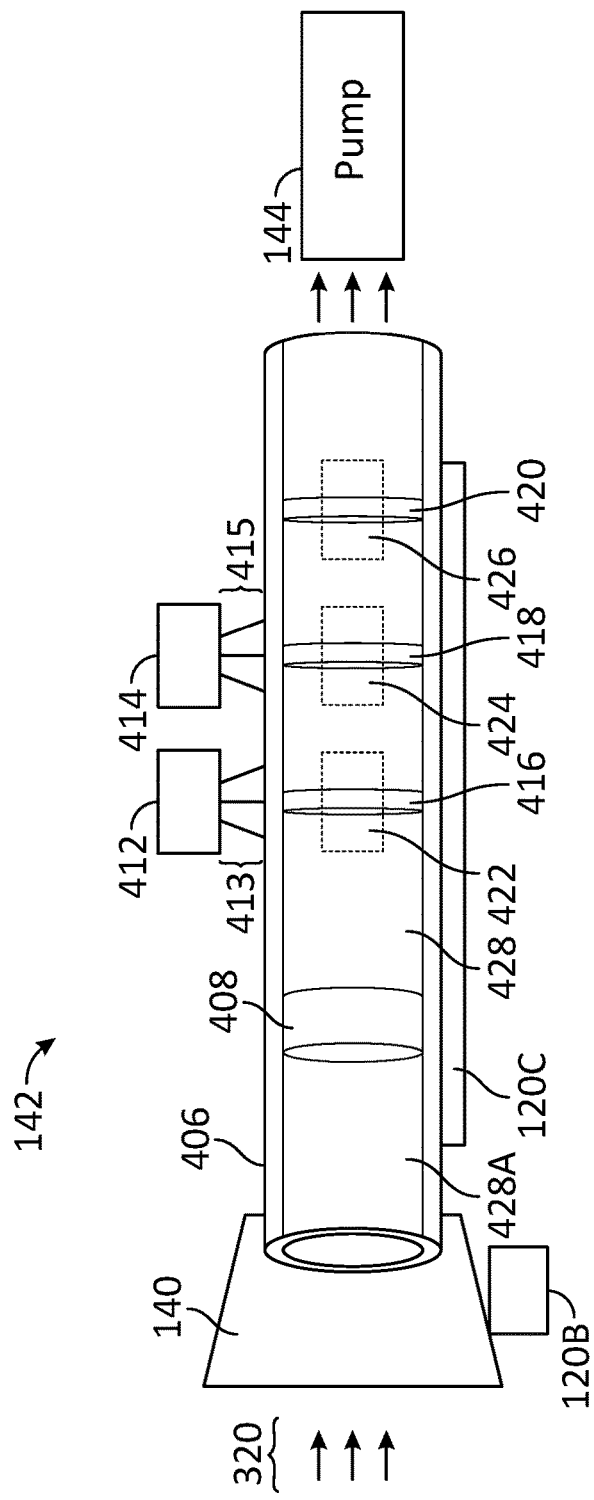
FIG. 4 illustrates a partial cross section view of a chemical detector of a trace material detection device in accordance with an embodiment of the disclosure.
Figure 5:
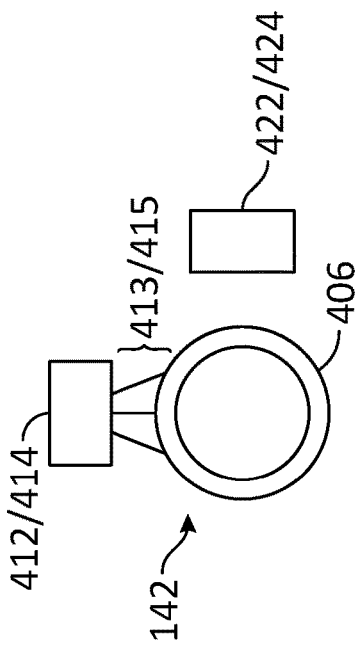
FIG. 5 illustrates a front view of a chemical detector of a trace material detection device.

FIGS. 4 and 5 illustrate various views of chemical detector 142 of device 100 in accordance with embodiments of the disclosure.

As shown, the detector 142 includes an inlet 140, a tip heater 120B, a substrate reporter surface 406 (e.g., implemented as a capillary tube providing a flow path in these particular illustrated embodiments), a sensing channel 428 (e.g., implemented as a cavity within a capillary tube in these particular illustrated embodiments), an acid catalyst 408, a reporter heater 120C, various chemical reporters 416, 418, and 420, illumination sources 412 and 414 (e.g., also referred to as excitation sources) associated with chemical reporters 416 and 418, and response detectors 422, 424, and 426 associated with chemical reporters 416, 418, and 420.

Illumination sources 412 and 414 are optional, in that they are not required in chemical detection techniques that do not involve illumination of chemical reporters 416 and 418. For example, when a chemical reporter responds to a material of interest by exhibiting a change in resistivity, illumination sources 412 and 414 are not needed. In this case, the response of the chemical reporter is exhibited by a corresponding change in current or voltage that is detected by an appropriate detector. Thus, detection techniques other than those that involve excitation (e.g., radiation or light) are contemplated As shown, when implemented as a capillary tube, substrate reporter surface 406 defines sensing channel 428, which provides a flow path through which vapor-phase analytes 320 pass through and react with acid catalyst 408 and interact with chemical reporters 416, 418, and 420.

Analytes 320 pass through inlet 140, where analytes 320 may be heated by tip heater 120B. Tip heater 120B maintains inlet 140 at a temperature sufficient to keep analytes 320 in the vapor-phase. More specifically, tip heater 120B prevents loss of analytes 320 while traveling through inlet 140 toward chemical reporters 416, 418, and 420. Pump 144 continues to pull the air with analyte(s) 320 in through inlet 140 and provides the ability to move vapor-phase analytes 320 from inlet 140 to sensing channel 428 and over acid catalyst 408 and chemical detectors 416, 418, and 420. Reporter heater 120C heats the interior surface of substrate reporter surface 406 to reduce the formation of "cold spots" where analytes 320 can lump together. In addition, reporter heater 120C helps analytes 320 desorb from chemical reporters 416, 418, and 420 to improve subsequent detection of analytes. In some embodiments, sensing channel 428 includes an initial portion 428A to prevent overheating of chemical reporters 416, 418, and 420 due to their proximity to tip heater 120B.

Once analytes 320 are introduced into sensing channel 428 beyond the initial portion 428A, acid catalyst 408 reacts with analytes 320. As shown, acid catalyst 408 is in the form of a coating on substrate reporter surface 406. For example, an aqueous or alcoholic suspension of acid catalyst 408 may be spin-coated on the interior of a capillary tube in liquid form and then dried. In this example, acid catalyst 408 may be spun out the front of the sensing channel 428, thereby coating the entire first portion of the capillary tube or trimmed to make a band.

Figure 6:
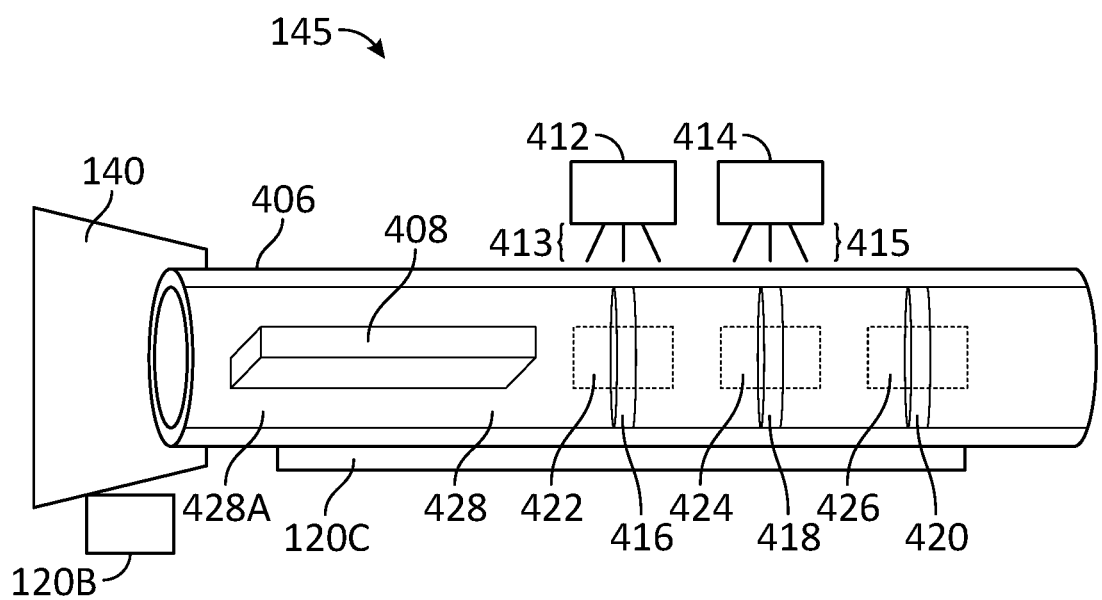
FIG. 6 illustrates a partial cross sectional view of a chemical detector of a trace material detection device in accordance with another embodiment of the disclosure.

FIG. 6 illustrates another chemical detector 145 in which acid catalyst 408 is in the form of a strip inserted into substrate reporter surface 406 (also implemented as a capillary tube), but is generally identical to chemical detector 142 of FIG. 4 in all other respects. Accordingly, the discussion of chemical detector 142 herein is also applicable to chemical detector 145.

In various embodiments, acid catalyst 408 includes one or more perfluorinated polymers containing sulfonic acid groups. For example, acid catalyst 408 may include a sulfonated tetrafluoroethylene based fluoropolymer-copolymer, such as Nafion® acid catalyst.

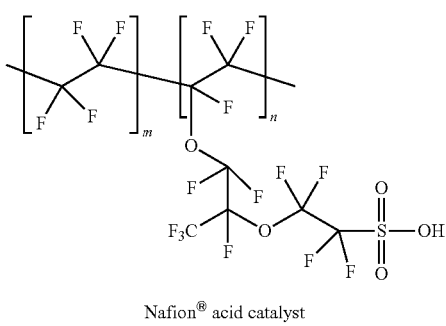

Nafion® acid catalyst

In other examples, acid catalyst 408 includes a copolymer of tetrafluoroethylene and a sulfonyl fluoride vinyl ether, such as Aquivion® acid catalyst.

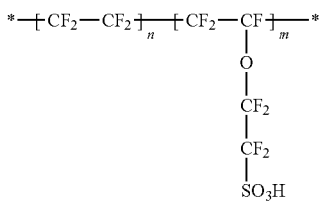

Aquivion® acid catalyst

Other compounds including strongly acidic side groups attached to a chained backbone with low vapor pressure can be used. For example, a macro-porous polystyrene based ion exchange resin like Amberlyst® catalyst may be used as acid catalyst 408. Another example of a suitable acid catalyst 408 is polystyrene sulfonic acid.

In some embodiments, acid catalyst 408 includes one or more acids selected from the group consisting of sulfuric acid, hydrochloric acid, hydrofluoric acid, hydroiodic acid, hydrobromic acid, nitric acid, oxalic acid, hydrogen sulfate, phosphoric acid, formic acid, benzoic acid, acetic acid, propionic acid, or other organic acids of the form R—COOH where R is an alkyl, substituted alkyl, aryl, or substituted aryl group or at least one other cation donor.

Acid catalyst 408 ideally hydrolyzes the nitric acid precursors into nitric acid and provides no contribution to molecules in the vapor phase. In some embodiments, this can be accomplished by using an acid having a counter ion (negatively charged component that remains after a proton is donated) that has a sufficiently low vapor pressure at the operating temperature of chemical detector 142.

In various embodiments, acid catalyst 408 facilitates the interaction of test sample 302 and test sample 303 with chemical reporters 418 and 420, respectively. Acid catalyst 408 enhances the performance of chemical reporters 418 and 420 (e.g., provided in any order as appropriate), resulting in faster generation of a detectable response at response detectors 424 and 426. For example, acid catalyst 408 may increase the rate of hydrolysis of test sample 302, resulting in a faster response of chemical reporter 418 to nitric acid and faster detection of a response of chemical reporter 418 to nitric acid at response detector 424. Acid catalyst 408 may also facilitate the degradation of test sample 303 to hydrogen peroxide, which can interact with chemical reporter 420 and provide a detectable response at response detector 426.

After interacting with acid catalyst 408, analytes 320 move over each of the chemical reporters 416, 418, and 420. In some embodiments, chemical reporters 416, 418, and 420 may be placed in any order. In addition, although illustrated as discrete sections in FIGS. 4 and 6, chemical reporters 416, 418, and 420 may contact each other and/or may be layered over each other in some embodiments.

In this example, chemical reporter 416 is operable to detect certain military explosives and may be termed a "military explosives chemical reporter." In some embodiments, military explosives chemical reporter 416 includes an amplifying fluorescent polymer or other military chemical reporter. The intensity of light emitted by the amplifying fluorescent polymer varies in response to interaction of the amplifying fluorescent polymer with analytes 320.

For example, the binding of one analyte molecule to the amplifying fluorescent polymer quenches the emission of many polymer repeat units. Thus, when an analyte of interest lands on a polymer binding site, many polymer repeat units in the vicinity of the bound analyte do not emit absorbed light as fluorescence. As a result, the polymer fluorescence is said to be "quenched" by the adsorption of the analyte molecule.

In various embodiments, military explosives chemical reporter 416 is associated with illumination source 412 having an associated wavelength and response detector 422 (e.g., an optical detector). Illumination source 412 (e.g., a LED) emits light 413 in a wavelength that interacts with the amplifying fluorescent polymer to cause the amplifying fluorescent polymer to generate an emission. In certain embodiments, the wavelength is about 400 nm (e.g., 365 nm). In some embodiments, illumination source 412 only illuminates the portion of military explosives chemical reporter 416 that contains the amplifying fluorescent polymer. Response detector 422 (e.g., a photodiode) is positioned to receive the emission generated by the amplifying fluorescent polymer to detect the presence of one or more analytes 320. As shown in FIG. 5, in some embodiments, illumination source 412 and response detector 422 are positioned to be out of line of sight, for example 90 degrees apart. This ensures that light emitted by illumination source 412 is not captured by response detector 422, so that response detector 422 captures mostly the emission generated by the amplifying fluorescent polymer. Other dispositions of illumination source 412 and response detector 422 are contemplated, and illumination source 412 and response detector 422 can be positioned in any desired configuration (e.g., in close proximity or co-located in some embodiments). Inlet 140 is not shown in FIG. 5 for purposes of clarity.

Examples of analytes that are detectable by military explosives chemical reporter 416 are TNT (e.g., test sample 301) and nitroglycerin (e.g., test sample 302). Other substances that may be detected are disclosed in U.S. Pat. No. 6,558,626, which is incorporated by reference in its entirety by express reference thereto.

In an example, chemical reporter 418 is operable to detect certain nitrogen-based explosives, such as nitric acid precursors like nitroglycerin (e.g., test sample 302), and may be termed a "nitric acid chemical reporter." In some embodiments, nitric acid chemical reporter 418 includes a fluorescent compound that is pH sensitive (e.g., acid sensitive). A suitable fluorescent compound is 2-[5-methoxy-2-(4-phenyl-quinoline-2yl)-phenyl]-ethanol, as represented by the following structure:

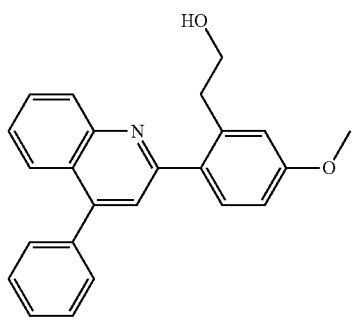 [SMILES: COc1ccc(-c2cc(-c3ccccc3)c3ccccc3n2)c(CCO)c1]

Other suitable fluorescent compounds are disclosed in U.S. Pat. No. 9,068,960, which is incorporated by reference in its entirety by express reference thereto. Increases or decreases in the response of the fluorescent compound of the nitric acid chemical reporter 418 to light establish the presence of nitric acid (and a nitric acid precursor). For example, upon reaction of nitric acid with the fluorescent compound of the nitric acid chemical reporter 418, the fluorescent compound will undergo a change in fluorescent response intensity.

Nitric acid chemical reporter 418 is associated with illumination source 414 having an associated wavelength (e.g., 365 nm) and response detector 424 (e.g., an optical detector). Illumination source 414 (e.g., a LED) emits light 415 in a wavelength that interacts with the fluorescent compound of the nitric acid chemical reporter 418 to cause the fluorescent compound to generate an emission. Response detector 424 is positioned to receive the emission generated by the fluorescent compound of the nitric acid chemical reporter 418 to detect the presence of nitric acid. Response detector 424 detects the changes in response of the fluorescent compound of the nitric acid chemical reporter 418 to thereby establish the presence of a nitric acid precursor. Illumination source 414 and response detector 424 may be positioned out of line of sight as shown in FIG. 5.

In some embodiments, an initial response baseline may be first established for the fluorescent compound of the nitric acid chemical reporter 418. To establish the baseline response for the fluorescent compound of the nitric acid chemical reporter 418, a user activates illumination source 414 and heaters 120A, 120B, and 120C, allowing each to achieve operational conditions. Then the user presents substrate reporter surface 406 (implemented as a capillary tube in the illustrated embodiments), free of analytes 320, to illumination source 414 and response detector 424 to produce a detectable response from the fluorescent compound of the nitric acid chemical reporter 418. Thus, any response resulting from this process is free of influence from nitric acid, and can be used to detect whether a change in response occurs.

In an example, chemical reporter 420 is operable to detect certain peroxide-based explosives, such as peroxide precursors like TATP (e.g., test sample 303), and may be termed a "peroxide chemical reporter." In some embodiments, peroxide chemical reporter 420 includes a light-emitting peroxide-reactive compound and is associated with response detector 426 (e.g., an optical detector). Light-emitting materials suitable for use may be any luminescent material, including dyes, oligomers, polymers, and combinations thereof. The light-emitting material may be selected to exhibit certain properties, such as a particular emission wavelength, high quantum yield, high output light efficiency when formulated in a peroxide reactive system, and/or compatibility (e.g., solubility) with one or more components of the system. Additional details regarding the light-emitting materials are found in U.S. Pat. No. 9,005,524, which is incorporated by reference in its entirety by express reference thereto.

The light-emitting peroxide-reactive material responds to the hydrogen peroxide generated from peroxide precursors to produce energy in the form of the emission of a photon. In some embodiments, the resulting energy can stimulate luminescence of the light-emitting peroxide-reactive material such that light energy is emitted. The resulting emission may be detected by response detector 426, which signals the presence of hydrogen peroxide (and a peroxide precursor).

Figure 7:
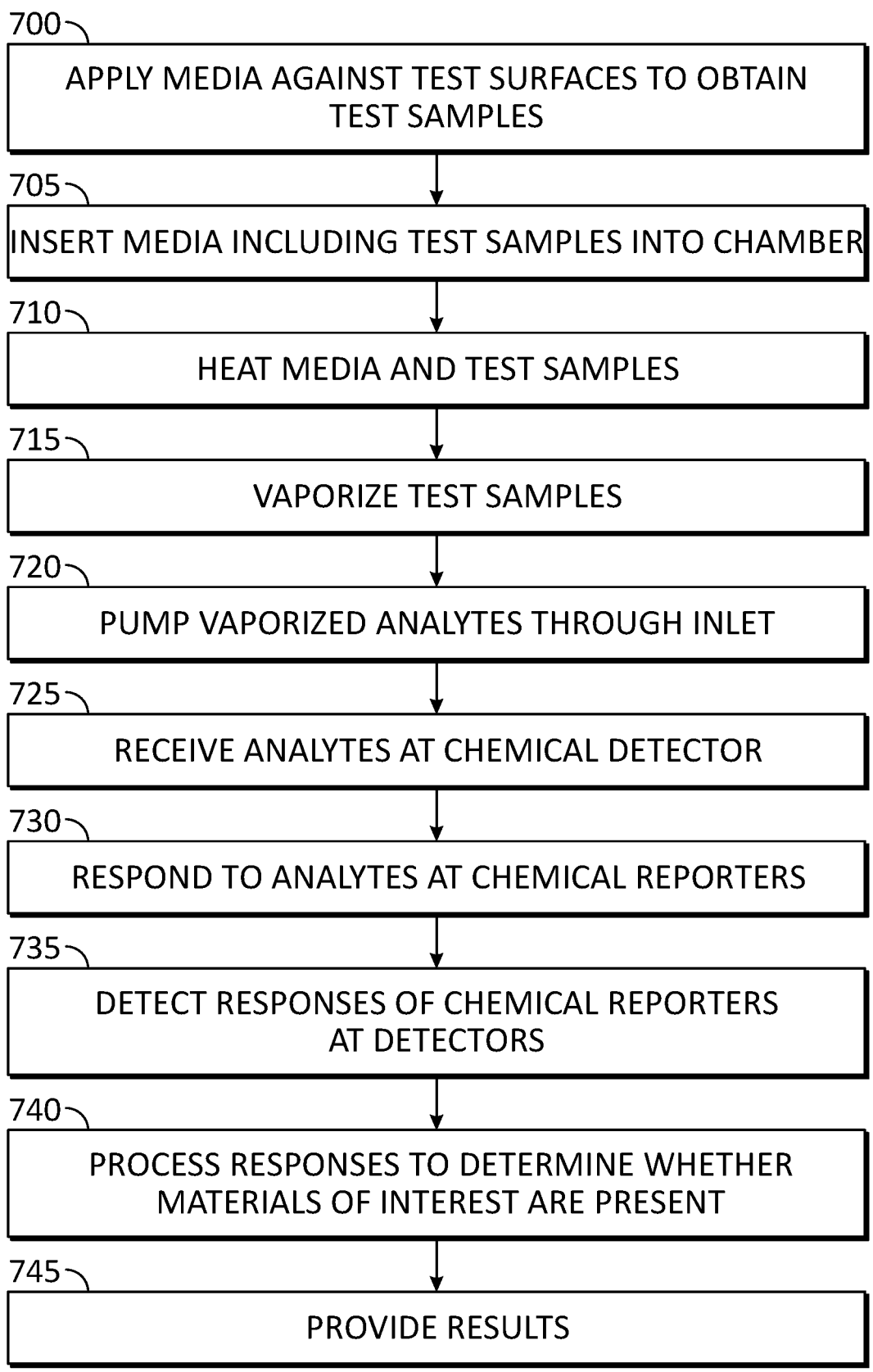
FIG. 7 illustrates a process of operating a trace material detection device in accordance with an embodiment of the disclosure.

FIG. 7 illustrates a process of operating device 100 in accordance with an embodiment of the disclosure. In block 700, a user applies media 300 against a test surface (e.g., a package, luggage, clothing, or other article) to obtain one or more test samples (e.g., test samples 301, 302, and 303 as shown in FIG. 3) corresponding to trace materials residing on the test surfaces.

In block 705, the user inserts media 300 through slot 104 and into chamber 122 as shown in FIG. 3. In block 710, heater 120 applies heat 310 to media 300 and test samples 301, 302, and 303. In various embodiments, processor 112 may operate heater 120 in response to the user's operation of one or more user controls 106 and/or automatically in response to the insertion of media 300 into chamber 122.

In block 715, test samples 301, 302, and 303 are at least partially vaporized to provide analytes 320 in response to heat 310 applied by heater 120. In various embodiments, heat is applied to both sides of media 300, as shown in FIG. 3.

In some embodiments, media 300 and chamber 122 are not required, such as when vapor-phase analytes are directly drawn into inlet 140 from the ambient environment. In such embodiments, blocks 705, 710, and 715 may be omitted and the process of FIG. 7 may begin with block 720.

In block 720, pump 144 operates to draw analytes 320 through inlet 140. In block 725, analytes 320 are received by chemical detector 142 as shown in FIG. 3.

In block 730, chemical reporters respond to the presence of analytes 320. For example, military explosives chemical reporter 416 may respond to the portion of analytes 320 corresponding to test samples 301 and 302, nitric acid chemical reporter 418 may respond to the portion of analytes 320 corresponding to test sample 302, and peroxide chemical reporter 420 may respond to the portion of analytes 320 corresponding to test sample 303.

In block 735, responses of the chemical reporters to the analytes 320 are detected. For example, response detector 422 detects the response of military explosives chemical reporter 416 to the portion of analytes 320 corresponding to test samples 301 and 302, response detector 424 detects the response of nitric acid chemical reporter 418 to the portion of analytes 320 corresponding to test sample 302, and response detector 426 detects the response of peroxide chemical reporter 420 to the portion of analytes 320 corresponding to test sample 303.

In block 740, processor 112 determines whether materials of interest are present based on the responses detected by response detectors 422, 424, and 426. In block 750, the results of block 740 are provided to the user, for example, by messages and/or graphics provided by display 108, audible notifications provided by audio component 132, and/or other techniques as appropriate.

Figure 8:
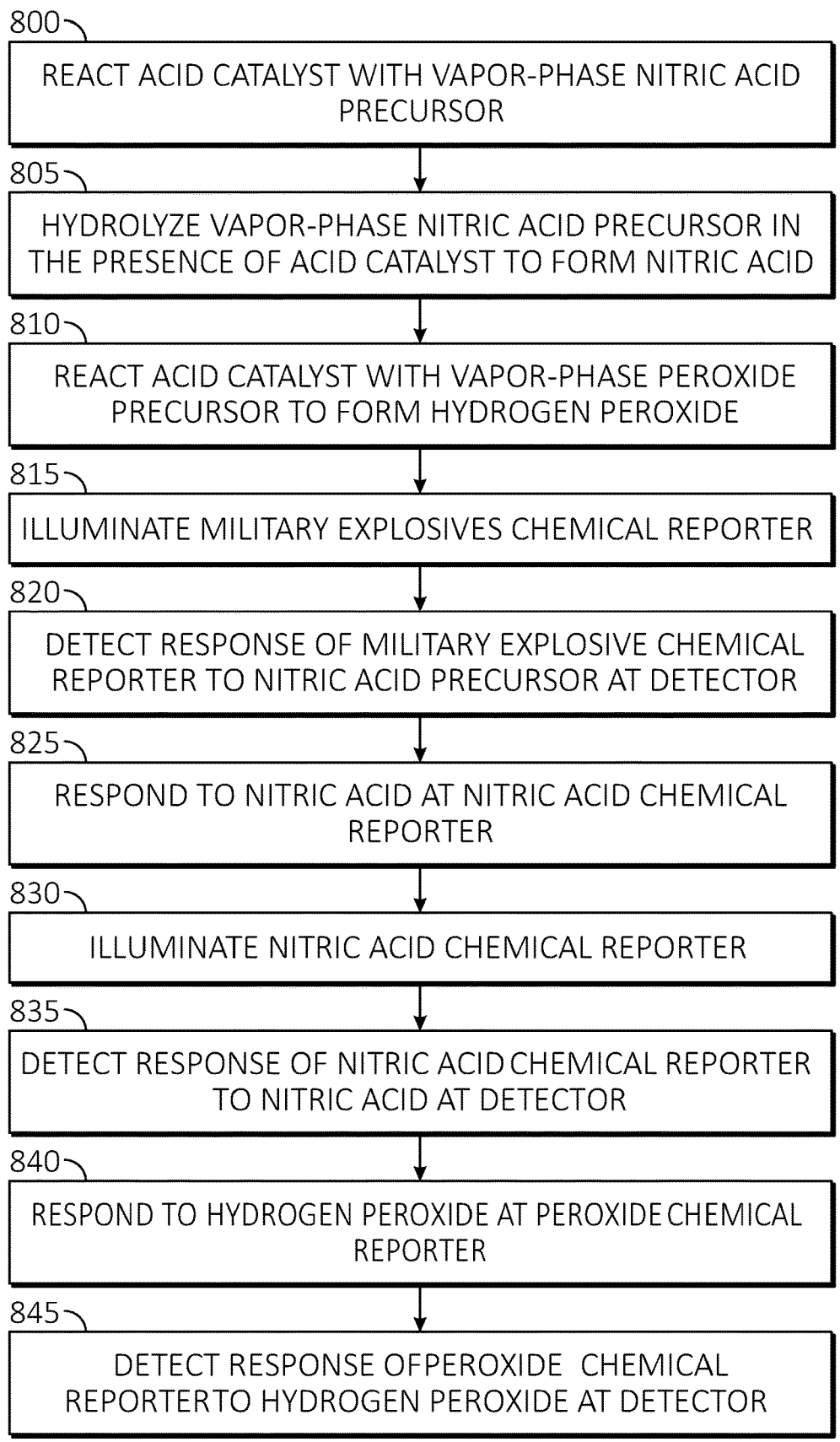
FIG. 8 illustrates a more detailed process of operating a trace material detection device in accordance with an embodiment of the disclosure.

FIG. 8 illustrates more process details performed during one or more of blocks 725-735 of FIG. 7 in embodiments that use emission (e.g., fluorescent and luminescent) techniques. Other detection techniques (e.g., change in resistivity) are contemplated in this disclosure. In block 800, acid catalyst 408 reacts with the portion of analytes 320 including a vapor-phase nitric acid precursor (e.g., corresponding to test sample 302). Referring back to FIG. 4, analytes 320 are drawn into sensing channel 428 by pump 144, and acid catalyst 408 reacts with analytes 320. In block 805, the vapor-phase nitric acid precursor is hydrolyzed in the presence of the acid catalyst 408 to provide nitric acid. In block 810, acid catalyst 408 reacts with the portion of analytes 320 including a vapor-phase peroxide precursor (e.g., corresponding to test sample 303) to form hydrogen peroxide.

In block 815, a military explosives chemical reporter 416 is illuminated. In FIG. 4, military explosives chemical reporter 416 is illuminated by illumination source 412. In block 820, a response of the military explosives chemical reporter 416 to the portion of analytes 320 including the vapor-phase nitric acid precursor is detected at response detector 422. For example, military explosives chemical reporter 416 may respond to the nitric acid precursor to create a change in fluorescent response that is detected by response detector 422. In various embodiments, military explosives chemical reporter 416 may respond to the nitric acid precursor by quenching the military explosives chemical reporter 416.

In block 825, nitric acid chemical reporter 418 responds to the nitric acid produced from the acid catalyzed hydrolysis of the nitric acid precursor. For example, the nitric acid that is formed after exposure of the nitric acid precursor to acid catalyst 408 encounters nitric acid chemical reporter 418. In block 830, the nitric acid chemical reporter 418 is illuminated. As shown in FIG. 4, illumination source 414 illuminates nitric acid chemical reporter 418.

In block 835, a response of the nitric acid chemical reporter 418 to the nitric acid is detected at response detector 424. For example, the interaction between nitric acid and the nitric acid chemical reporter 418 may result in a change in the nitric acid chemical reporter 418 that is detected by response detector 424. In various embodiments, processor 112 determines whether a particular material of interest (e.g., nitric acid precursor) is present in the test sample based on the response of the military explosives chemical reporter 416 and response of the nitric acid chemical reporter 418.

In some embodiments, the change in the nitric acid chemical reporter 418 may be combined with the change in the military explosives chemical reporter 416 to more definitively determine that a nitric acid precursor is present in the test sample. Also, in some embodiments, the relative responses of the nitric acid chemical reporter 418 and the military explosives chemical reporter 416 as received by response detectors 424 and 422 may be compared and analyzed (e.g., by processor 112 in block 740) to identify one or more materials of interest. In this regard, some materials of interest that include nitric acid precursors may cause different relative responses to be exhibited by the nitric acid chemical reporter 418 (e.g., in response to the nitric acid formed by reaction of acid catalyst 408 with the nitric acid precursor) and the military explosives chemical reporter 416 (e.g., in response to the nitric acid precursor analytes themselves responding to the military explosives reporter 416). As such, these different relative responses may permit various materials of interest to be identified with further particularity and accuracy (e.g., through the use of two different chemical reporters 416 and 418).

In block 840, peroxide chemical reporter 420 responds to the hydrogen peroxide produced from the reaction of the peroxide precursor with the acid catalyst 408. In block 845, a response of the peroxide chemical reporter 420 to the hydrogen peroxide is detected at response detector 426. For example, the interaction between the hydrogen peroxide and peroxide chemical reporter 420 may result in a luminescent response of the peroxide chemical reporter 420 that is detected by response detector 426.

Figure 9:
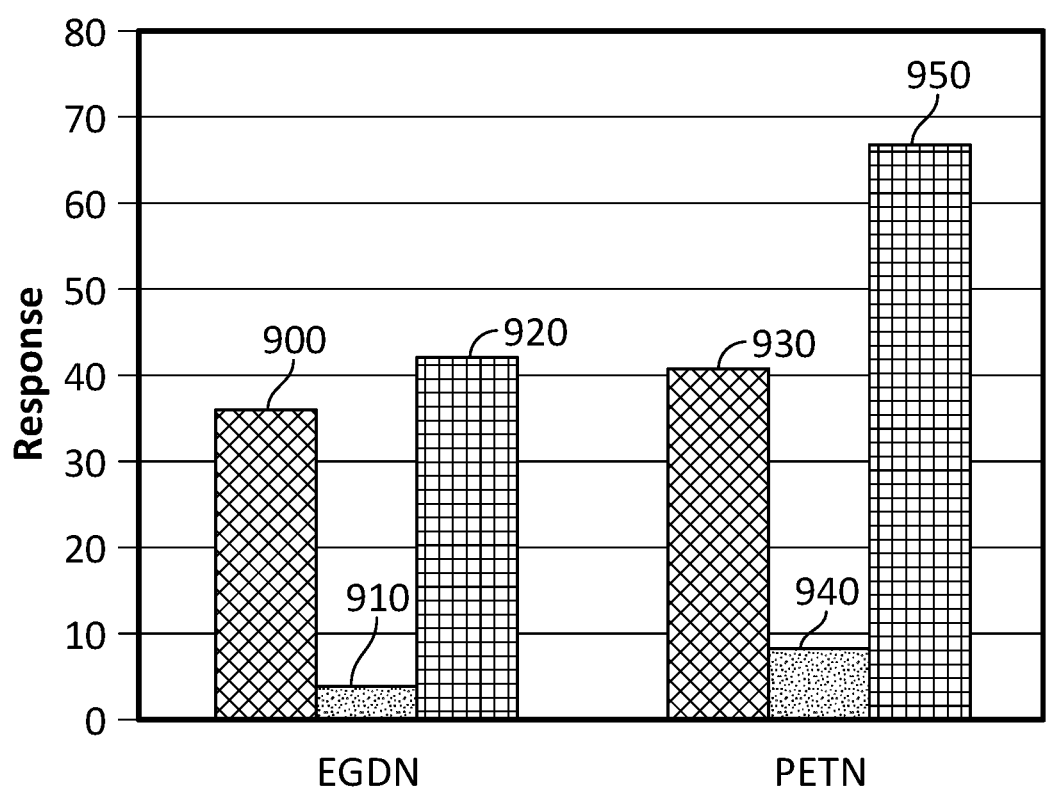
FIG. 9 illustrates a graph comparing various chemical detection techniques in accordance with an embodiment of the disclosure.

FIG. 9 illustrates a graph comparing various chemical detection techniques in accordance with an embodiment of the disclosure. A comparison of the response of nitric acid chemical reporter 418 to EGDN and PETN in the presence of Aquivion® acid catalyst in the form of a strip and a suspension is shown.

Bars 910 and 940 illustrate the response of nitric acid chemical reporter 418 to nitrate esters, for example EGDN and PETN, and to a lesser extent nitramines, for example RDX, when acid catalyst 408 is disposed downstream of nitric acid chemical reporter 418. In other words, acid catalyst does not react with nitrate esters or nitramines before interaction with nitric acid chemical reporter 418. This results in a relatively low response and low detectability of nitrate esters or nitramines.

In contrast, when acid catalyst 408 is disposed upstream of nitric acid chemical reporter 418 (e.g., as shown in FIGS. 4 and 6), the response of nitric acid chemical reporter 418 to nitrate esters or nitramines is significantly increased as shown in bars 900, 920, 930, and 950. Bars 920 and 950 show an increased detectability with use of Aquivion® acid catalyst in the form of a suspension compared to Aquivion® acid catalyst in the form of a strip (bars 900 and 930).

In view of the present disclosure, it will be appreciated that devices and related methods are provided to detect the presence of trace chemicals corresponding to materials of interest using acid catalyzed hydrolysis. Use of an acid catalyst increases the response of chemical reporters to certain materials of interest, such as nitrogen-based and peroxide-based explosives. Moreover, by using multiple chemical reporters, various materials of interest may be identified with increased accuracy.

As discussed, in some embodiments, an acid catalyst may be provided in the flow path of a chemical detector to react with various materials of interest. Such reaction provides nitric acid which may be detected by one or more downstream chemical reporters. In some cases, the acid catalyst may be physically positioned within the flow path itself (e.g., as a strip of material) as shown in FIG. 6.

Therefore, in accordance with embodiments discussed herein, techniques are provided to secure a memory material component within a flow path in a convenient and reliable manner that utilizes certain unique expansion properties of the component. For example, the component may be a deformable component that is configured to transition from a deformed state back to a rest state or an intermediate state in response to an applied stimulus.

Although such components are primarily discussed herein with regard to a memory material component implemented by a memory polymer material, other types of memory material components are contemplated such as metal, foam, cellulose, and/or others. Similarly, although a heat stimulus is primarily discussed herein, other types of stimuli are contemplated such as chemical exposure (e.g., with water, alcohol, or other chemicals), hydration, electromagnetic excitation (e.g., including optical signals), electrical signals, and/or other stimuli which may be used with any appropriate memory material component.

By utilizing these features in various unique implementations, a memory material component may be effectively inserted and secured within a flow path having any desired geometry. Although these techniques are illustrated and described primarily in the context of chemical detectors, such techniques may be usefully applied to any desired implementation where it may be desired to secure a component in a structure having an interior cavity defined by interior side walls.

Moreover, by securing a component using these techniques, it can be maintained at a desired position within a flow path and will resist the tendency to migrate down the flow path or to become dislodged, for example, in response to external physical forces, fluid pressure within the flow path, temperature changes, and/or other factors.

With regard to the specific case of a memory material component implemented by a memory polymer, the memory polymer is a polymer material that may be transitioned from a deformed state back to a rest state (or partially back to an intermediate state as further discussed herein) in response to the application of heat. For example, such material may be initially provided in a rest state (e.g., a normal or natural state) having an initial rest state geometry at room temperature. The material may then be transitioned to a deformed state (e.g., through the application of force, pressure, chemical exposure (e.g., with water, alcohol, or other chemicals), hydration, electromagnetic excitation (e.g., including optical signals), electrical signals, and/or other techniques) having a deformed state geometry that continues to be maintained at room temperature. The deformed material may then be inserted into a flow path and then stimulated by heat (or one or more of the various stimuli discussed herein). In response to the heat, the material will transition from the deformed state geometry back to the rest state geometry.

If the rest state geometry exhibits an initial width, the deformed state geometry may exhibit a different width (e.g., a smaller width if the material has been compressed together or stretched in another direction). In response to the heat, the deformed material will transition back to the original rest state geometry having the initial width. Thus, in some cases, the width of the material may be reduced in response to deformation operations, and increased in response to heat.

Significantly, if the deformed material having the reduced width is positioned in an enclosed space with a width smaller than that of the rest state geometry, application of heat will cause the deformed material to begin transitioning back to the rest state geometry. However, if the enclosed space is not wide enough to accommodate the width of the rest state geometry, then the material will be unable to fully return to the rest state. Instead, the material will begin to abut the walls of the enclosed space and settle into an intermediate state having a width greater than the deformed geometry but smaller than the rest state geometry.

Advantageously, this arrangement can permit the material to become secured against the side walls of the enclosed space through its abutment caused by the expansion in response to heat. Significantly, after the material cools, it retains the intermediate geometry. Moreover, further heating and cooling cycles will not cause the material to deform (e.g., reduce its width). Indeed, in some embodiments, such cycles may cause the material to exert even more force against the side walls of the enclosed space through its attempted expansion back to the rest state geometry.

Advantageously, these properties may be used to secure a component made of the memory material within a flow path. This is particularly advantageous in the case of small flow paths having relatively narrow widths that would otherwise require the introduction of additional materials or mechanical features for securing components therein.

In some embodiments, the memory material may be a memory polymer material that is also an acid catalyst for use with a flow path of a chemical detector. For example, in some cases, the memory polymer material may be used to secure an acid catalyst in accordance with the embodiment shown in FIG. 6. In some cases, the memory polymer material may be a sulfonated tetrafluoroethylene based fluoropolymer-copolymer. For example, the memory polymer material may be Nafion® which may be advantageously used in some cases due to its relatively long shelf life of one to two years or more.

In some embodiments, memory material may be provided in various physical forms. For example, in some cases, it may be provided as a strip of memory material. In some cases, it may be provided with a binding agent to help maintain a desired structure or to accommodate the inclusion of additional materials.

Although particular memory polymer materials are discussed herein primarily for use with flow paths of chemical detector, it will be understood that any type of memory material (e.g., metal, foam, cellulose, and/or others as discussed) may be used with any type of flow path or enclosed space (e.g., whether provided as part of a chemical detector or other uses).

Figure 10:
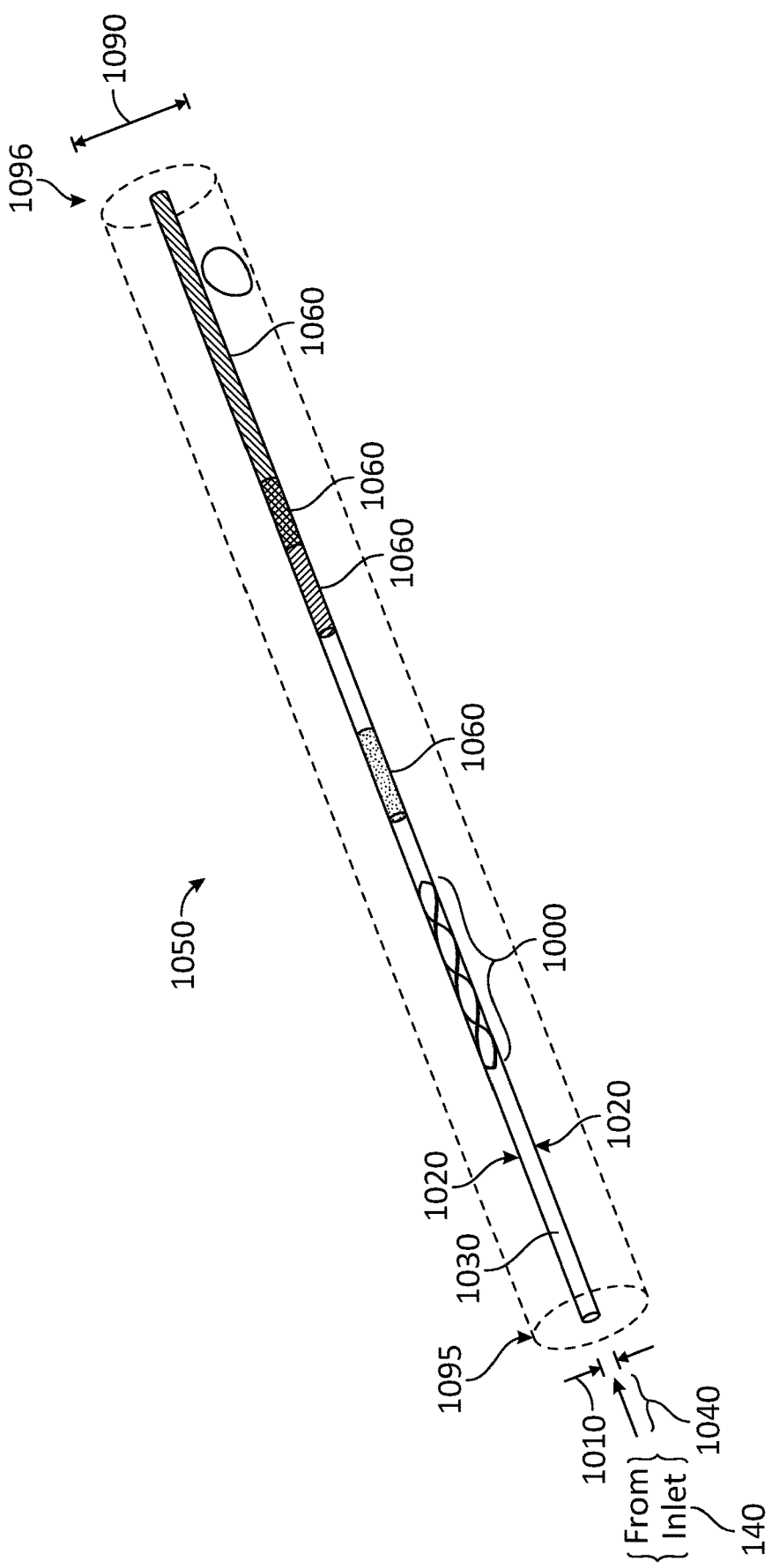
FIG. 10 illustrates a structure providing a flow path with a memory material component retained therein in accordance with an embodiment of the disclosure.

FIG. 10 illustrates a structure 1050 providing a flow path 1030 with a memory material component 1000 retained therein in accordance with an embodiment of the disclosure. As shown in FIG. 10, structure 1050 may be a capillary tube (e.g., silanized capillary glass in some embodiments) of a chemical detector (e.g., such as chemical detector 142). Structure 1050 includes flow path 1030 (e.g., a sensing channel) corresponding to an interior cavity defined by interior side walls 1020 of structure 1050 and having a diameter 1010 (e.g., width). In some embodiments, ends 1095 and 1096 of structure 1050 may be fire polished smooth which may reduce the inside diameter 1010 at input and output apertures of flow path 1030 at ends 1095 and 1096, respectively.

In some embodiments, side walls 1020 may be implemented by a continuous interior surface to provide a substantially cylindrical flow path 1030 as shown. In other embodiments, side walls 1020 may be implemented by multiple surfaces and/or other shapes to provide any desired shape or form to flow path 1030 (e.g., with varying side walls, diameters, and/or directions).

As also shown, one or more chemical reporters 1060 are provided within structure 1050 and may be implemented, for example, in accordance with any of the various chemical reporter embodiments discussed herein. When operated as part of a detection device (e.g., detection device 100), structure 1050 receives air and various analytes 1040 from inlet 140 (e.g., in response to one or more test samples 301-303 as discussed). The analytes may react with component 1000 and/or any of the chemical reporters 1060 in accordance with the various embodiments provided herein.

In FIG. 10, component 1000 is secured within flow path 1030 by tension imparted by the abutment of component 1000 against side walls 1020. In this regard, FIG. 10 illustrates a completed installation of component 1000 within structure 1050 after it has transitioned from a rest state having a width greater than diameter 1010 to a deformed state having a diameter less than diameter 1010, and further after it has been inserted and heated to transition from the deformed state to an intermediate state having a width limited in a transverse direction within flow path 1030 by the diameter 1010. In this regard, the abutment of component 1000 against side walls 1020 limits the diameter of component 1000 in the transverse direction to the diameter 1010 of flow path 1030.

Structure 1050 and component 1000 may be implemented with various sizes as appropriate for particular applications. For example, in some chemical detector embodiments: structure 1050 has an outside diameter 1090 of 5.0 mm (0.197 inches) and an inside diameter 1010 of 0.6 mm+/−0.05 mm (0.024 inches+/−0.002 inches); component 1000 has a length of 0.375 inches and a width of 0.001 inches to 0.009 inches greater than the inside diameter 1010 of structure 1050 in the rest state at room temperature; and component 1000 has a width of 0.001 inches to 0.003 inches smaller than the inside diameter 1010 of structure 1050 in the deformed state at room temperature. The above-noted sizes and configurations may be adjusted to accommodate various tolerances, and other sizes and configurations are contemplated for use in other embodiments.

Component 1000 may be laterally positioned at any desired location within flow path 1030 for various applications. For example, in some embodiments, component 1000 may be displaced 0.375 inches from end 1095 as shown in FIG. 10. In other embodiments, component 1000 may be positioned at end 1095. Other positions may be used as appropriate.

Various types of deformation operations may be performed on component 1000 to transition it from the rest state to the deformed state as further discussed with regard to FIGS. 11 to 15. Although certain deformation operations are described individually and in certain combinations, it will be understood that any desired combination of deformation operations may be performed. For example, in some embodiments, multiple deformation operations may be performed sequentially and/or simultaneously.

Figure 11:
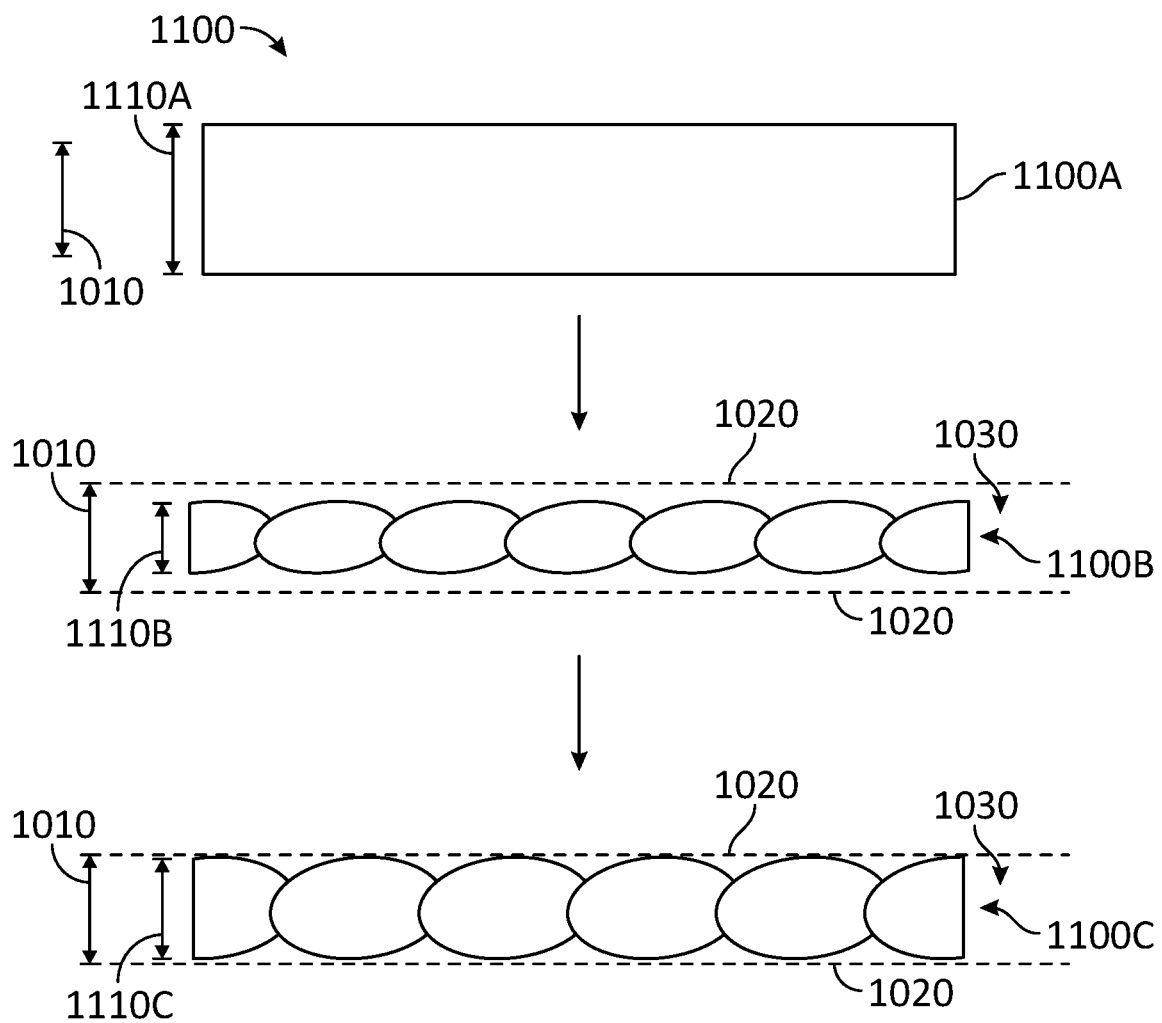
FIG. 11 illustrates a process of deforming a memory material component by twisting in accordance with an embodiment of the disclosure.

In the embodiment shown in FIG. 10, component 1000 has been deformed by twisting. In this regard, FIG. 11 illustrates a process of deforming a memory material component 1100 by twisting in accordance with an embodiment of the disclosure. Component 1100 is initially provided as a strip of material in a rest state 1100A having a width 1110A larger than diameter 1010 of flow path 1030. In some embodiments, component 1100 may have a length of 0.375 inches and a width 1110A of 0.025 inches in the rest state 1100A.

Component 1100 is then deformed by twisting to transition from rest state 1100A to a deformed state 1100B having a width 1110B smaller than diameter 1010 of flow path 1030 to permit component 1100 to be inserted into flow path 1030 (e.g., illustrated with broken lines). Any desired type of twisting operation may be performed. For example, in some embodiments, component 1100 may be twisted to exhibit 16 to 20 turns per inch in the deformed state 1100B.

Component 1100 is then inserted into flow path 1030 and heated and/or otherwise stimulated as discussed to transition from deformed state 1100B to an intermediate state 1100C in which it abuts side walls 1020 of flow path 1030 and has a width 1110C corresponding to the diameter 1010 of flow path 1030. In some embodiments, the heating may also cause component 1100 to at least partially untwist as shown in intermediate state 1100C. However, the side walls 1020 will prevent component 1100 from fully untwisting and instead component 1100 will become securely wedged within flow path 1030.

Figure 12:
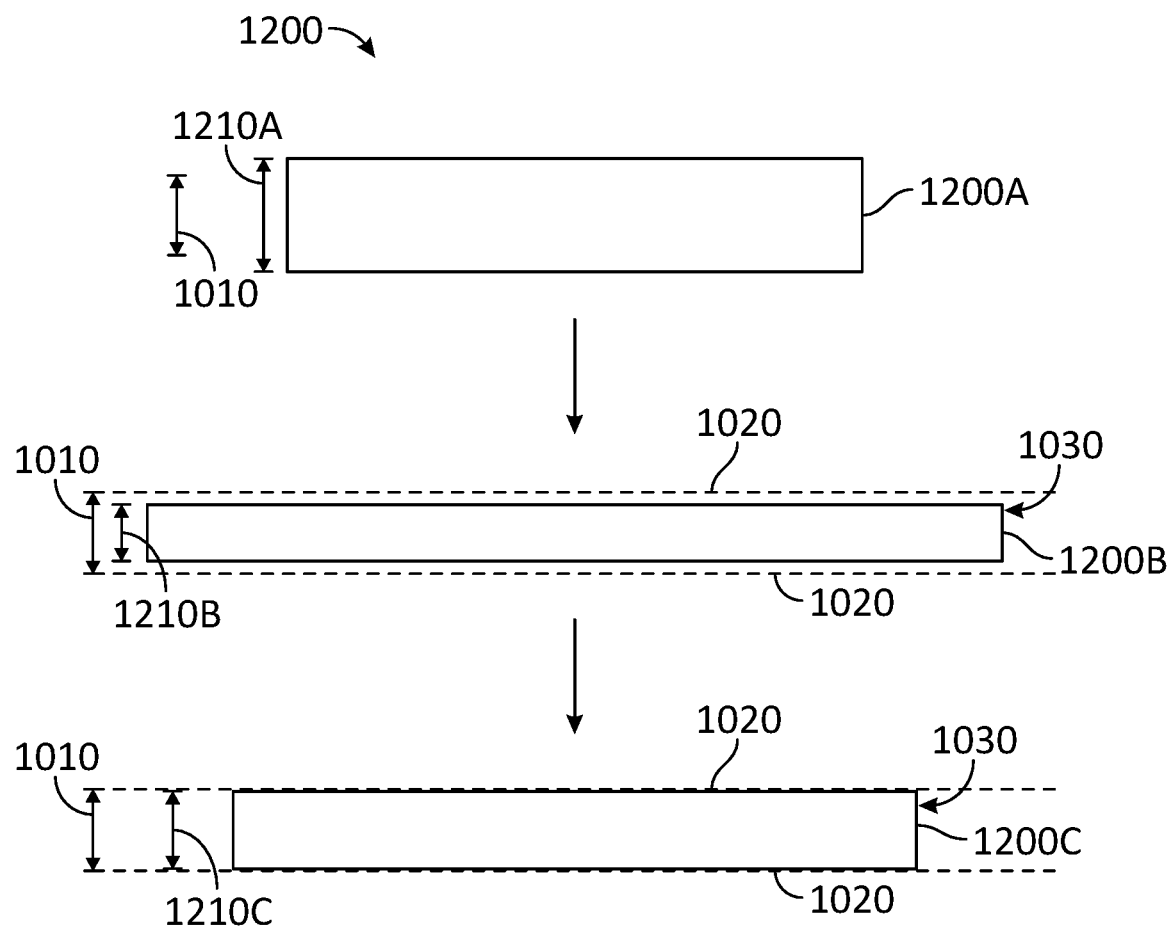
FIG. 12 illustrates a process of deforming a memory material component by stretching in accordance with an embodiment of the disclosure.

FIG. 12 illustrates a process of deforming a memory material component 1200 by stretching in accordance with an embodiment of the disclosure. Component 1200 is initially provided as a strip of material in a rest state 1200A having a width 1210A larger than diameter 1010 of flow path 1030. In some embodiments, component 1200 may have a length of 0.375 inches to 0.75 inches and a width 1210A of 0.028 inches in the rest state 1200A.

Component 1200 is then deformed by stretching to transition from rest state 1200A to a deformed state 1200B having a width 1210B smaller than diameter 1010 of flow path 1030 to permit component 1200 to be inserted into flow path 1030. Any desired type of stretching operation may be performed. For example, in some embodiments, component 1200 may be pulled lengthwise to stretch out in an elongated manner. In some embodiments, such stretching may increase the length of component 1200 by up to 200 percent of its original length.

Component 1200 is then inserted into flow path 1030 and heated and/or otherwise stimulated as discussed to transition from deformed state 1200B to an intermediate state 1200C in which it abuts side walls 1020 of flow path 1030 and has a width 1210C corresponding to the diameter 1010 of flow path 1030. In some embodiments, the heating may also cause component 1200 to at least partially shorten while also increasing in width as shown in intermediate state 1200C. However, the side walls 1020 will prevent component 1200 from fully shortening and instead component 1200 will become securely wedged within flow path 1030.

Figure 13:
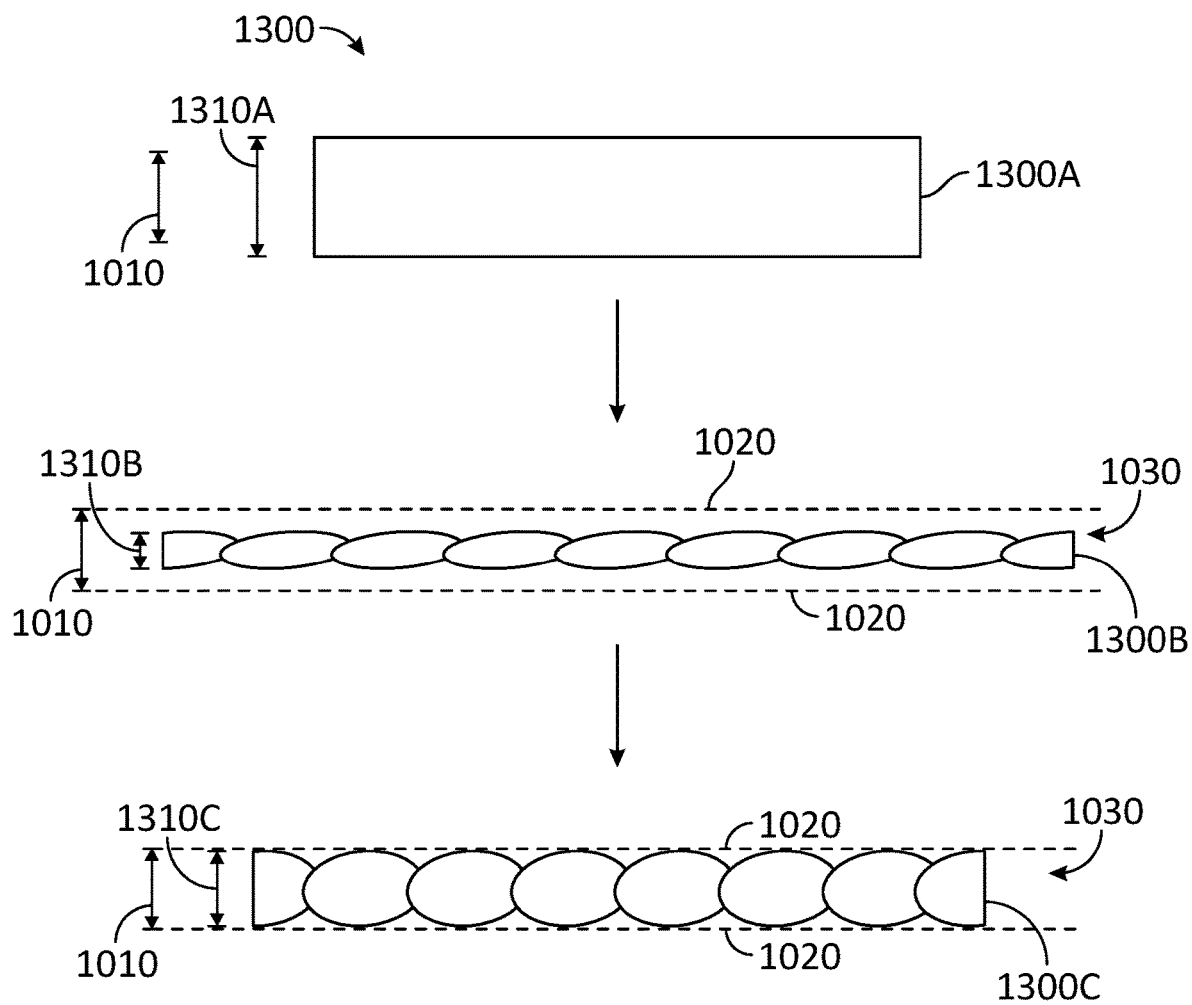
FIG. 13 illustrates a process of deforming a memory material component by stretching and twisting in accordance with an embodiment of the disclosure.

FIG. 13 illustrates a process of deforming a memory material component 1300 by stretching and twisting in accordance with an embodiment of the disclosure. Component 1300 is initially provided as a strip of material in a rest state 1300A having a width 1310A larger than diameter 1010 of flow path 1030. In some embodiments, component 1300 may have a length of 0.375 inches to 0.75 inches and a width 1310A of 0.028 inches in the rest state 1300A.

Component 1300 is then deformed by stretching and twisting to transition from rest state 1300A to a deformed state 1300B having a width 1310B smaller than width 1310A to permit component 1300 to be inserted into flow path 1030. In various embodiments, stretching and twisting may be performed as discussed with regard to FIGS. 11 and 12 in one or more sequential and/or simultaneous deformation operations as desired. In some embodiments, component 1300 may be twisted to exhibit 20 to 25 turns per inch in the deformed state 1300B. In some embodiments, such stretching and twisting may increase the length of component 1200 by up to 150 percent or 200 percent of the original length.

Component 1300 is then inserted into flow path 1030 and heated and/or otherwise stimulated as discussed to transition from deformed state 1300B to an intermediate state 1300C in which it abuts side walls 1020 of flow path 1030 and has a width 1310C corresponding to the diameter 1010 of flow path 1030. Similar to the embodiments discussed in FIGS. 11 and 12, the heating may also cause component 1200 to at least partially untwist and at least partially shorten as shown in intermediate state 1200C. However, the side walls 1020 will prevent component 1300 from fully untwisting and fully shortening, and instead component 1300 will become securely wedged within flow path 1030.

Figure 14:
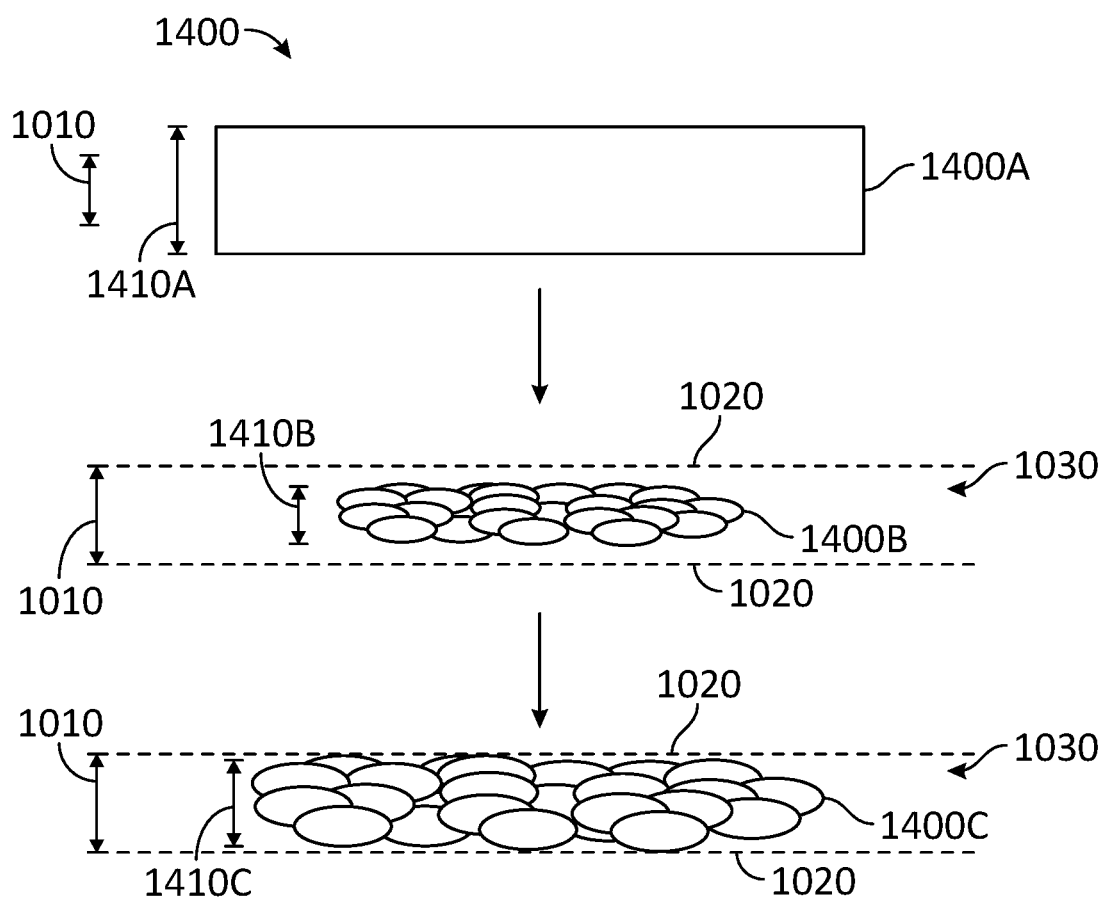
FIG. 14 illustrates a process of deforming a memory material component by compression in accordance with an embodiment of the disclosure.

FIG. 14 illustrates a process of deforming a memory material component 1400 by compression in accordance with an embodiment of the disclosure. Component 1400 is initially provided as a strip of material in a rest state 1400A having a width 1410A larger than diameter 1010 of flow path 1030.

Component 1400 is then deformed by compression to transition from rest state 1400A to a deformed state 1400B having a width 1410B smaller than diameter 1010 of flow path 1030 to permit component 1100 to be inserted into flow path 1030. Any desired type of compression operation may be performed. For example, in some embodiments, component 1400 may be compacted by force into a crumpled, folded, or wadded up deformed shape in deformed state 1400B to permit insertion into flow path 1030. In some embodiments, component 1400 may be pre-stretched and/or otherwise deformed before it is further compacted by force.

Component 1400 is then inserted into flow path 1030 and heated and/or otherwise stimulated as discussed to transition from deformed state 1400B to an intermediate state 1400C in which it abuts side walls 1020 of flow path 1030 and has a width 1410C corresponding to the diameter 1010 of flow path 1030.

Figure 15:
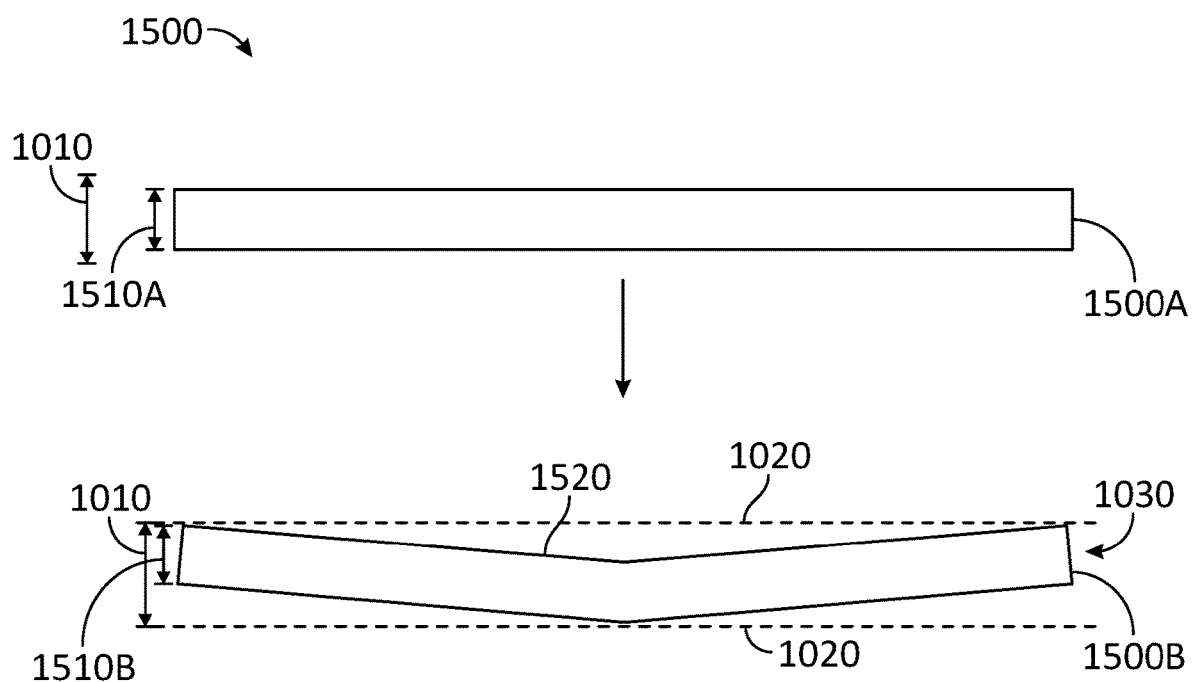
FIG. 15 illustrates a process of deforming a memory material component by bending in accordance with an embodiment of the disclosure.

FIG. 15 illustrates a process of deforming a memory material component 1500 by bending in accordance with an embodiment of the disclosure. Component 1500 is initially provided as a strip of material in a rest state 1500A having a width 1510A larger than diameter 1010 of flow path 1030. In some embodiments, component 1500 may have a length of 0.375 inches and a width 1510A of 0.021 inches in the rest state 1500A.

Component 1500 is then deformed by bending to transition from rest state 1500A to a deformed state 1500B having a width 1510B approximately equal to diameter 1010 of flow path 1030 to permit component 1100 to be inserted into flow path 1030 in a press fit manner to abut side walls 1020 of flow path 1030 and thus be retained within flow path 1030. Any desired type of bending operation may be performed. For example, in some embodiments, component 1500 may be bent to introduce one or more kinks such as kink 1520 shown in deformed state 1500B. Component 1500 is then inserted into flow path 1030 and further operations may be performed as desired.

Figure 16:
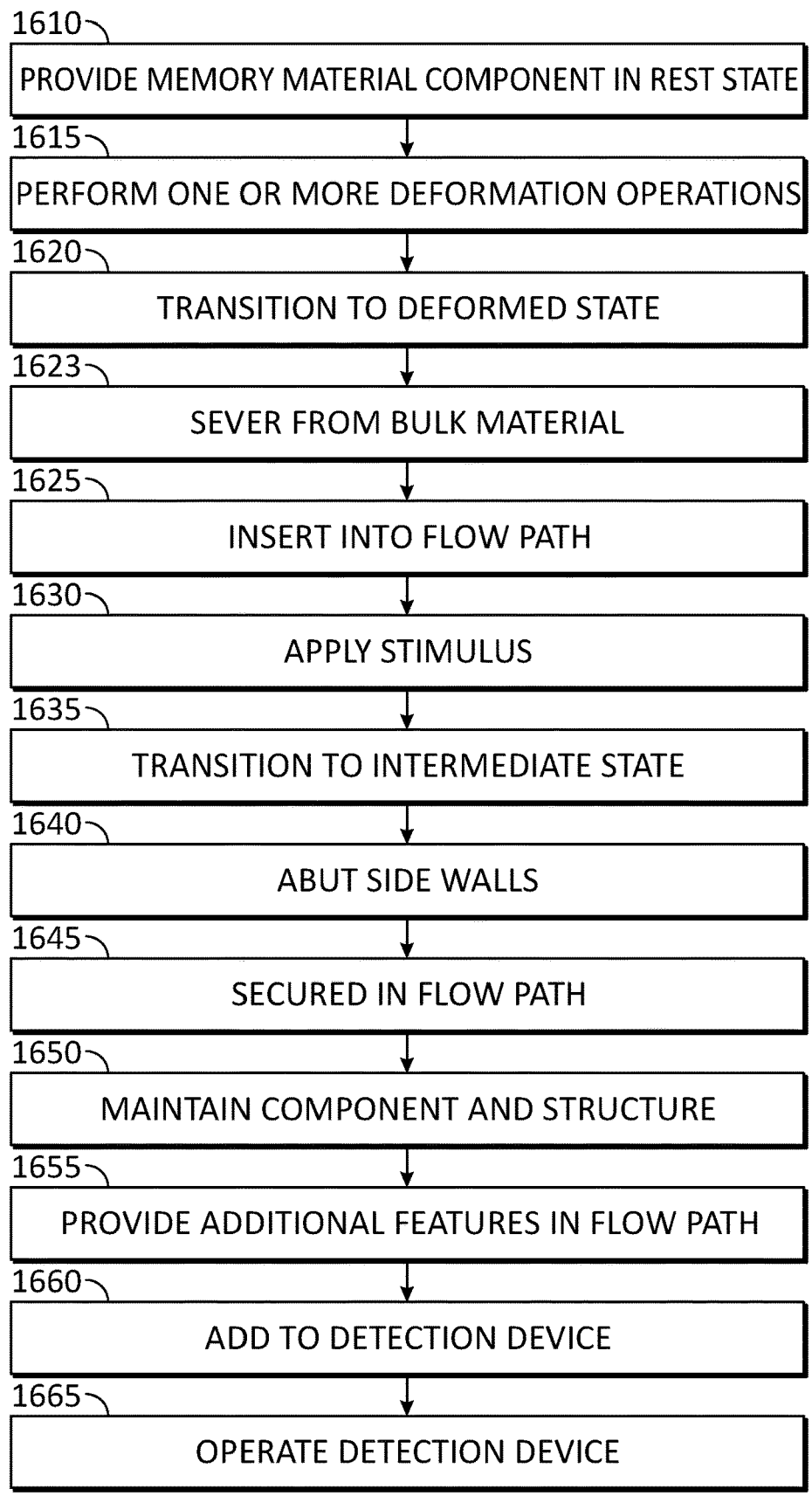
FIG. 16 illustrates a process of securing a memory material component in a flow path in accordance with an embodiment of the disclosure.

FIG. 16 illustrates a process of securing memory material component 1000 in flow path 1030 in accordance with an embodiment of the disclosure. Although FIG. 16 will be discussed generally in relation to memory material component 1000, it will be understood that the various operations of FIG. 16 may be performed in relation to any of memory material components 1000, 1100, 1200, 1300, 1400, and/or 1500.

In block 1610, component 1000 is provided in a rest state having a diameter greater than diameter 1010 of flow path 1030. For example, in some embodiments, component 1000 may be provided as a Nafion® strip that has not yet been heated or deformed.

In some embodiments, one or more operations to cut, trim, singulate, and/or otherwise provide component 1000 in a desired size may be performed, whether as part of block 1610 or otherwise. For example, in various embodiments, such operations may be performed any desired time, such as prior to, during, and/or after any of the operations of FIG. 16. For example, in some embodiments, component 1000 may be provided as part of a bulk memory material in block 1610 and subsequently severed from the bulk material (e.g., cut to size) in block 1623 after one or more deformation operations of block 1615 to permit larger sized components to be pre-stretched or pre-twisted, and then cut to size with a width smaller than the diameter 1010 of flow path 1030.

In block 1615, one or more deformation operations are performed on component 1000 as discussed. As a result, in block 1620, component 1000 transitions from the rest state to a deformed state having a diameter smaller than diameter 1010 of flow path 1030 as discussed.

As discussed, in some embodiments, component 1000 may be provided in block 1610 as part of a bulk memory material (e.g., a larger sheet, strip, or other physical implementation of memory material from which component 1000 may be provided). In this regard, the one or more deformation operations of block 1615 may be performed on the bulk memory material. Accordingly, in some embodiments, an additional operation to sever component 1000 from the bulk memory material may be performed in block 1623.

In block 1625, the deformed component 1000 is inserted into flow path 1625 of structure 1050. In block 1630, a stimulus is applied. As discussed, such stimulus may be provided in various forms such as heat, chemical exposure (e.g., with water, alcohol, or other chemicals), hydration, electromagnetic excitation (e.g., including optical signals), electrical signals, and/or other stimuli. Accordingly, it is contemplated that multiple stimulus operations may be performed in some embodiments.

For example, in some embodiments, heat may be applied to structure 1050 while component 1000 remains inserted in flow path 1030, thus causing both structure 1050 and component 1000 to be heated. In this regard, structure 1050 may be made of a resilient material that maintains its shape while also transferring heat to component 1000 residing therein. In some embodiments, heat may be locally applied only to a portion of structure 1050 to prevent damage to chemical reporters 1060 and/or other portions of structure 1050. In some embodiments, heat may be directed specifically to component 1000, for example, by one or more directional heating elements inserted into flow path 1030.

In the case of a heat stimulus, various temperature ranges may be used. For example, in some embodiments, component 1000 may be heated from room temperature (e.g., 20 to 25 degrees C.) up to a temperature that will cause component 1000 to begin transitioning from the deformed state back to an intermediate state or rest state. In embodiments where component 1000 comprises Nafion®, this heated temperature may be, for example, in a range from 90 degrees C. to 140 degrees C. and may be applied, for example, from 10 minutes to 30 minutes, which may also be shorter or longer. Other temperatures and associated times may be used for other types of memory materials as appropriate. For example, in some embodiments, significantly shorter heating times (e.g., 1 to 10 seconds) may be used by heating component 1000 directly, such as through the introduction of heated gas into flow path 1030.

In response to the applied stimulus, in block 1635, component 1000 transitions to an intermediate state having an increased width in comparison to the deformed state as discussed. As a result, in block 1640, component 1000 abuts side walls 1020 of structure 1050 as discussed. Accordingly, in block 1645, component 1000 is secured within flow path 1030 by tension imparted by the abutment of component 1000 against side walls 1020. Thus, component is retained within flow path 1030 and may be reliably used without unexpected translation or shifting within flow path 1030.

In some embodiments, additional manufacturing operations may be performed to prepare structure 1050 for use in a chemical detector. For example, in block 1650, structure 1050 and component 1000 may be maintained in the intermediate state to permit the applied stimulus to subside. For example, in the case of a heat stimulus, structure 1050 and component 1000 may be cooled. In block 1655, one or more components, coatings, and/or other features such as chemical reporters may be provided. In some embodiments, such features may be provided at any desired time, such as prior to, during, and/or after any of the operations of FIG. 16. In block 1660, component 1050 is added to a detection device, such as detection device 100 discussed herein. In block 1665, the detection device is operated in accordance with the various techniques described herein.

In view of the present disclosure, it will be appreciated that improved techniques are provided for manufacturing, implementing, and providing components within a flow path in an efficient and useful manner. By selectively deforming and stimulating a memory material component as discussed, the component may be effectively secured and retained within a flow path. As discussed, such techniques are particularly useful for small diameter flow paths that are not otherwise amenable to conventional attachment techniques without introducing potential chemical contamination or impractical mechanical requirements.

Moreover, by using a memory material component comprising a memory polymer material that is also an acid catalyst, the various chemical detection operations described herein may be performed using the memory polymer component's chemical structure to detect various materials of interest, while also taking advantage of the component's material structural properties to retain the component within the flow path as discussed.

Other embodiments are also contemplated. For example, although various applications have been discussed with regard to air flow through chemical detectors, the inventive concepts disclosure herein may be likewise applied to any desired fluid flow path (e.g., gas fluid flows or solid fluid flows) and any desired type of device (e.g., including various types of detectors or other devices or systems).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
providing a memory material component in a rest state;
performing a deformation operation to transition the component from the rest state to a deformed state;
inserting the component into a flow path defined by fixed interior side walls of a structure;
applying a stimulus to transition the component from the deformed state to an intermediate state in which the component abuts the side walls to secure the component in the flow path, wherein the component comprises a memory polymer configured to passively receive the stimulus from an external source to transition from the deformed state to the intermediate state;
wherein the component comprises a catalyst configured to facilitate a reaction in response to a precursor received through the flow path;
wherein the structure is part of a chemical detector responsive to the reaction to determine whether a material of interest is present; and
wherein the component in the rest state exhibits a first width greater than an interior diameter of the flow path, the component in the deformed state exhibits a second width smaller than the interior diameter, and the component in the intermediate state exhibits a third width between the first and second widths.

2. The method of claim 1, wherein the applying a stimulus comprises heating the component.

3. The method of claim 1, wherein the deformation operation comprises: twisting, stretching, compressing, and/or bending the component.

4. The method of claim 1, wherein:
the component is provided as part of a bulk memory material;
the deformation operation is performed on the bulk memory material; and
the method further comprises severing the deformed component from the bulk memory material prior to the inserting.

5. The method of claim 1, wherein the component comprises a solid strip of memory material.

6. The method of claim 1, wherein the component comprises a memory material and a binding agent.

7. The method of claim 1, wherein the structure is a substantially cylindrical capillary tube.

8. The method of claim 1, wherein:
the precursor is a vapor-phase nitric acid precursor and the catalyst is an acid catalyst configured to hydrolyze the vapor-phase nitric acid precursor to form nitric acid; and
the chemical detector is responsive to the nitric acid to determine whether the material of interest is present.

9. A device comprising a memory material component secured in a flow path by the method of claim 1.

10. A device comprising:
a structure comprising fixed interior side walls defining a flow path;
a memory material component disposed within the flow path;
wherein the component is secured within the flow path by abutment against the side walls in response to:
a deformation operation to transition the component from a rest state to a deformed state for insertion into the flow path, and
an application of a stimulus to transition the component from the deformed state to an intermediate state in which the component abuts the side walls, wherein the component comprises a memory polymer configured to passively receive the stimulus from an external source to transition from the deformed state to the intermediate state;
wherein the component comprises is a catalyst configured to facilitate a reaction in response to a precursor received through the flow path;

wherein the structure is part of a chemical detector responsive to the reaction to determine whether a material of interest is present; and wherein the component in the rest state exhibits a first width greater than an interior diameter of the flow path, the component in the deformed state exhibits a second width smaller than the interior diameter, and the component in the intermediate state exhibits a third width between the first and second widths.

11. The device of claim 10, wherein the stimulus is heat applied to the deformed component.

12. The device of claim 10, wherein the deformation operation comprises: twisting, stretching, compressing, and/or bending the component.

13. The device of claim 10, wherein the component comprises a solid strip of memory material.

14. The device of claim 10, wherein the component comprises a memory material and a binding agent.

15. The device of claim 10, wherein the structure is a substantially cylindrical capillary tube.

16. The device of claim 10, wherein:
the precursor is a vapor-phase nitric acid precursor and the catalyst is an acid catalyst configured to hydrolyze the vapor-phase nitric acid precursor to form nitric acid; and
the chemical detector is responsive to the nitric acid to determine whether the material of interest is present.

\* \* \* \* \*